United States Patent
MacLean et al.

(10) Patent No.: US 8,433,607 B2
(45) Date of Patent: Apr. 30, 2013

(54) SYSTEM AND METHOD FOR EXCHANGING REWARD CURRENCY

(75) Inventors: Trevor Robert MacLean, Toronto (CA); Christopher John Douglas Barnard, Toronto (CA)

(73) Assignee: Points.com, Inc., Toronto (CA)

( * ) Notice: Subject to any disclaimer, the term of this patent is extended or adjusted under 35 U.S.C. 154(b) by 0 days.

(21) Appl. No.: 12/790,925

(22) Filed: May 31, 2010

(65) Prior Publication Data

US 2011/0004558 A1 Jan. 6, 2011

Related U.S. Application Data

(63) Continuation of application No. PCT/CA2008/002127, filed on Dec. 8, 2008.

(60) Provisional application No. 61/012,171, filed on Dec. 7, 2007.

(51) Int. Cl.
*G06Q 30/00* (2012.01)

(52) U.S. Cl.
USPC .................................................. 705/14.1

(58) Field of Classification Search ............ 705/14.1
See application file for complete search history.

(56) References Cited

U.S. PATENT DOCUMENTS

| | | | |
|---|---|---|---|
| 6,594,640 | B1 | 7/2003 | Postrel |
| 2001/0054006 | A1* | 12/2001 | Lee et al. .................... 705/26 |
| 2002/0143614 | A1 | 10/2002 | MacLean et al. |
| 2003/0040964 | A1 | 2/2003 | Lacek |
| 2006/0010033 | A1 | 1/2006 | Thomas |

FOREIGN PATENT DOCUMENTS

| | | |
|---|---|---|
| WO | WO 00/79461 A1 | 12/2000 |
| WO | WO 01/33451 A1 | 5/2001 |
| WO | WO 02/48942 A1 | 6/2002 |
| WO | WO 02/077884 A2 | 10/2002 |

OTHER PUBLICATIONS

Al-Saber, Enji; International Search Report from corresponding PCT Application No. PCT/CA2008/002127; search completed Mar. 30, 2009.

* cited by examiner

*Primary Examiner* — Daniel Lastra
(74) *Attorney, Agent, or Firm* — John R.S. Orange; Blake, Cassels & Graydon LLP

(57) ABSTRACT

Methods and systems are disclosed for allowing two users to exchange reward currency, such as points, between two different loyalty programs at an exchange rate that is set by and agreed upon by the users themselves. An offer to exchange X points of one loyalty program for Y points of another loyalty program is received from a user and is made available to other users. Another user satisfied with the offered exchange accepts the offer, and the account balances of the two users are adjusted. In some embodiments, a fee is charged to one or both of the users for effecting the trade. The fee is then forwarded to the loyalty programs. In other embodiments, the loyalty programs specify rules that must be complied with before a trade can occur.

36 Claims, 19 Drawing Sheets

Step 2: Begin creating your personal Points.com — 500
Already a member? Sign-in

My first name: [John]
My last name: [Doe] — 502
My e-mail address: [JohnDoe@computer.com] — 504

Protect your information with a password:
Your password must be 6-15 characters long and contain at least 1 letter, at least 1 number, and no spaces.

New password: [ ] — 506
Security question: [In which city were you born?]
Security answer: [ ] — 508
I live in: [United States of America]
My zip code is: [ ] — 512     510

☑ I agree to the following:
I accept the User Agreement and Privacy Policy. I may receive communications from Points.com and I understand that I can change my notification preferences at any time.

FIGURE 5

600 home | track balances | trade on GPX BETA | book hotels | swap | earn | buy | share | redeem Hello J. [...]! We have Suggestions for you. (If you're not J. [...] click here)

Register your Aeroplan® Account with Points.com aeroplan

Register your Aeroplan® program to get secure access to your points on this site. (How does this work?)

Not a member? Join this program now

602 → First Name: [John]
You must enter your First Name EXACTLY as it appears on your Aeroplan® membership card or statement.

604 → Last Name: [Doe]
You must enter your Last Name EXACTLY as it appears on your Aeroplan® membership card or statement.

606 → Aeroplan Number: [123456789101112]
Lost your Aeroplan number?
Call Aeroplan 1-800-361-5373.

608 → Aeroplan Password: [•••••]
Find your Aeroplan password

Register This Program

OR
I will register this program later

We can help you with these steps if you upgrade to Gold.

FIGURE 6

|  | USER 104a | LP 106a | LP 106b |
|---|---|---|---|
| from memory 112 | Transaction history (last 12 months) | 50,000 (given) | 0 (given) |
|  |  | 0 (received) | 10,000 (received) |
|  | exchange amount | 10,000 (give) | 20,000 (get) |

1102

| Rules | LP 106a | met? | LP 106b | met? |
|---|---|---|---|---|
| 1 | Give max 55,000 in 12 month period | ✗ | Give max 100,000 in 12 month period | ✓ |
| 2 | Receive max 55,000 in 12 month period | ✓ | Receive max 100,000 in 12 month period | ✓ |
| 3 | Give max 25,000 per trade | ✓ | Give max 35,000 per trade | ✓ |
| 4 | Receive max 25,000 per trade | ✓ | Receive max 25,000 per trade | ✓ | from 114

FIGURE 11

GPX Trading Board

SEARCH FOR TRADES

YOU'RE WILLING TO GIVE: 1304
Aeroplan®
Your Balance:

YOU WANT TO GET: 1306
Alaska Airlines Mileage Plan
Your Balance:

Search

Results: 5 trades available.

| # | YOU GIVE | YOU GET | YOU PAY* | ACTION |
|---|---|---|---|---|
| 1. | Give 30,000 miles (aeroplan) | Get 30,000 miles (Mileage Plan) | $315.00 | Accept This Trade |
| 2. | Give 25,000 miles (aeroplan) | Get 16,000 miles (Mileage Plan) | $262.50 | Accept This Trade |
| 3. | Give 14,000 miles (aeroplan) | Get 14,000 miles (Mileage Plan) | $147.00 | Accept This Trade |
| 4. | Give 8,000 miles (aeroplan) | Get 8,000 miles (Mileage Plan) | $84.00 | Accept This Trade |
| 5. | Give 7,000 miles (aeroplan) | Get 5,000 miles (Mileage Plan) | $73.50 | Accept This Trade |

5 Trades 1-5        Can't find the trade you want? Post a Trade

SYSTEM AND METHOD FOR EXCHANGING REWARD CURRENCY

CROSS-REFERENCE TO RELATED APPLICATIONS

This application claims filing priority of U.S. Provisional Patent Application Ser. No. 61/012,171, filed on Dec. 7, 2007, which is herein incorporated by reference.

FIELD OF THE INVENTION

The present invention relates generally to systems and methods for managing reward currency acquired from multiple loyalty programs.

DESCRIPTION OF THE PRIOR ART

Many people are members of loyalty programs. Loyalty programs award "reward currency", such as points, miles, or other credits to members who purchase goods and services offered by participating merchants. This reward currency may then be exchanged at a later date for goods and services. For example, an airline may establish a loyalty program that awards reward miles each time a member flies on their airline. Once the member has accumulated a certain amount of reward miles, the member may exchange the reward miles for discounts on flights and/or for other goods and services offered by the airline or by other participating merchants. The member is therefore motivated to remain loyal to the airline since by doing so he or she will accumulate reward miles that can be exchanged for valuable perks and rewards.

Loyalty programs have evolved over time into profitable businesses where profitability is maximized by providing an optimal level of overall utility for members. Indeed, if it is too difficult to earn reward currency and the redemption options are too limited, the popularity of the program will suffer and consequentially its profitability will decrease. On the other hand, if it is too easy to earn reward currency and the redemption options too costly for the program, the program will be popular but profitability will decrease as costs overtake revenue. Thus, loyalty programs are constantly searching for ways to improve member utility and profitability at the same time.

U.S. Pat. No. 6,594,640 issued to Postrel (the "Postrel Patent") discloses a system and method that allows users to consolidate reward points from different programs into a trading account that can be used for redeeming products and services offered over the Internet. In the Postrel Patent, reward points are redeemed from one or more programs for consideration at a certain fixed exchange rate. The consideration is accumulated in the trading account and can be used to purchase goods and services from merchants.

U.S. Patent Application Publication No. 2002/0143614 filed by MacLean et al. (the "MacLean Application") discloses a system and method of exchanging reward currency held by an individual from one program into another program without the need for an intermediary currency or a trading account. In other words, the MacLean Application discloses how person A may exchange reward points in program X for reward points in program Y based on a withdrawal rate from program X and a deposit rate for program Y.

U.S. Patent Application Publication No. 2003/0040964 filed by Lacek (the "Lacek Application"), inter alia, discloses a system that allows a user to transfer reward points from their account to another user's account within a particular loyalty program. For example, if person A and person B both have reward points from flying on airline Y, person A may transfer their airline Y reward points to person B. This may then allow person B to have enough airline Y reward points to exchange for a reward. However, person A does not receive anything in return from person B.

U.S. Patent Application Publication No. 2001/0054006 filed by Lee et al. (the "Lee Application") discloses a system in which a user can sell their reward points in exchange for a universal currency and vice versa. The exchange rate between reward points and universal currency is controlled by the system. Using the system disclosed in the Lee Application, a user may sell reward points accumulated in one loyalty program in exchange for universal currency, and then subsequently use the acquired universal currency to buy reward points from another loyalty program. To ensure no new reward points are created, the system waits for one user to sell reward points for intermediary currency before another user can purchase these reward points. Notably, in the Lee Application, an intermediary currency is required and an exchange rate between reward points and the intermediary currency is set by the system. Each user is bound to using the intermediary currency, and each user is bound to the set exchange rate between reward points and the intermediary currency. These limitations may adversely impact the profitability of the loyalty programs, and members may be subject to conditions that impact the perceived value or utility of the disclosed system. The Lee Application also fails to address the limits and conditions on transferability of reward currency, which almost always must be observed. Rather, the Lee Application presupposes that reward currencies are freely transferable, which is not true.

None of the prior art discussed above provides a trading or exchange solution that enhances member utility, satisfies the loyalty program rules and limitations, generates additional revenue for the loyalty programs and creates an attractive value proposition for members.

It is an object of the present invention to provide a method and system that addresses at least some of such requirements and obviates or mitigates the disadvantages of the prior proposals.

SUMMARY OF THE INVENTION

In general terms, the present invention provides systems and methods for allowing two users to exchange reward currency between two different loyalty programs at an exchange rate that is set by and agreed upon by the users themselves.

In one aspect of the invention, there is provided a method of facilitating a trade of a first reward currency issued by a first loyalty program and held by a member represented by a first user for a second reward currency issued by a second loyalty program and held by a member represented by a second user comprising the steps of: (a) electronically receiving an offer from the first user representing a first member having an account associated with the first loyalty program and an account associated with the second loyalty program, the offer comprising data specifying one quantity of reward currency of the first loyalty program that the first user is willing to trade for another quantity of reward currency of the second loyalty program; (b) making the offer available to a group of users including the second user; (c) electronically receiving an acknowledgement from the second user representing a second member having an account associated with the first loyalty program and an account associated with the second loyalty program, the acknowledgement comprising data specifying that the second user wishes to accept the offer; (d) decrementing the one quantity of reward currency from the first member's account associated with the first loyalty program and incrementing the one quantity of reward currency in the second member's account associated with the first loyalty program to establish new account balances for the first member's account associated with the first loyalty program and the second member's account associated with the first loyalty program; and (e) decrementing the another quantity of reward currency from the second member's account associated with the second loyalty program and incrementing the another quantity of reward currency in the first member's account associated with the second loyalty program to establish new account balances for the second member's account associated with the second loyalty program and the first member's account associated with the second loyalty program.

In one embodiment, the method further comprises the steps of: (a) notifying at least one of the first and second users of a fee to be paid for effecting the trade; (b) receiving payment of the fee from the at least one of the first and second users; and (c) subsequently forwarding a first portion of the payment to the first loyalty program and a second portion of the payment to the second loyalty program.

In another embodiment, the method further comprises the step of confirming the trade conforms to rules specified by the first loyalty program and the second loyalty program.

In another aspect of the invention, there is provided a system for trading reward currency between a first loyalty program and a second loyalty program, the first loyalty program having a database having an account value stored thereon associated with a first member represented by a first user and an account value stored thereon associated with a second member represented by a second user, and the second loyalty program having a database having an account value stored thereon associated with the first member and an account value stored thereon associated with the second member, the system comprising: (a) a plurality of communication links for communicating with a plurality of loyalty programs; the plurality of loyalty programs including the first loyalty program and the second loyalty program; (b) a first communication link for electronically receiving an offer from the first user; the offer comprising data specifying one quantity of reward currency from the first member's account associated with the first loyalty program that the first user is willing to trade for another quantity of reward currency for the first member's account associated with the second loyalty program; (c) a database accessible to a group of users for storing the offer thereon; (d) a second communication link for electronically receiving an acknowledgement from the second user, the second user within the group, and the acknowledgement comprising data specifying that the second user wishes to accept the offer; and (e) a processing unit configured for decrementing the one quantity of reward currency from the first member's account value associated with the first loyalty program and incrementing the one quantity of reward currency to the second member's account value associated with the first loyalty program, and configured for decrementing the another quantity of reward currency from the second member's account value associated with the second loyalty program and incrementing the another quantity of reward currency to the first member's account value associated with the second loyalty program.

In one embodiment, the processing unit is further configured for: calculating a fee to be paid by at least one of the first and second users for effecting the trade and notifying the at least one of the first and second users over a communication link of the fee; processing payment of the fee from the at least one of the first and second users received over the communication link; calculating a first portion of the payment and a second portion of the payment; and subsequently coordinating the transmission of the first portion to the first loyalty program and the second portion to the second loyalty program.

In another embodiment, the system further comprises memory having stored thereon rules specified by the first loyalty program and rules specified by the second loyalty program, and the processing unit is further configured for confirming the trade conforms to the rules.

BRIEF DESCRIPTION OF THE DRAWINGS

Embodiments of the invention will now be described by way of example only with reference to the accompanying drawings, in which:

FIG. 5 shows an embodiment of a webpage accessed by a user wishing to register with the exchange system;

FIG. 6 shows an embodiment of a webpage accessed by a user wishing to send their personal account information for a particular loyalty program to the exchange system;

FIG. 11 schematically illustrates an example of the exchange system policing rules established by the loyalty programs;

FIG. 13 shows an embodiment of a webpage accessed by a user wishing to view published trades;

FIG. 14 shows an embodiment of a webpage in which a user indicates to the exchange system that he wishes to accept a particular offer;

FIG. 15 shows an embodiment of a webpage in which updated account balances are displayed to a user after completion of the trade;

DETAILED DESCRIPTION OF THE INVENTION

Figure 1:
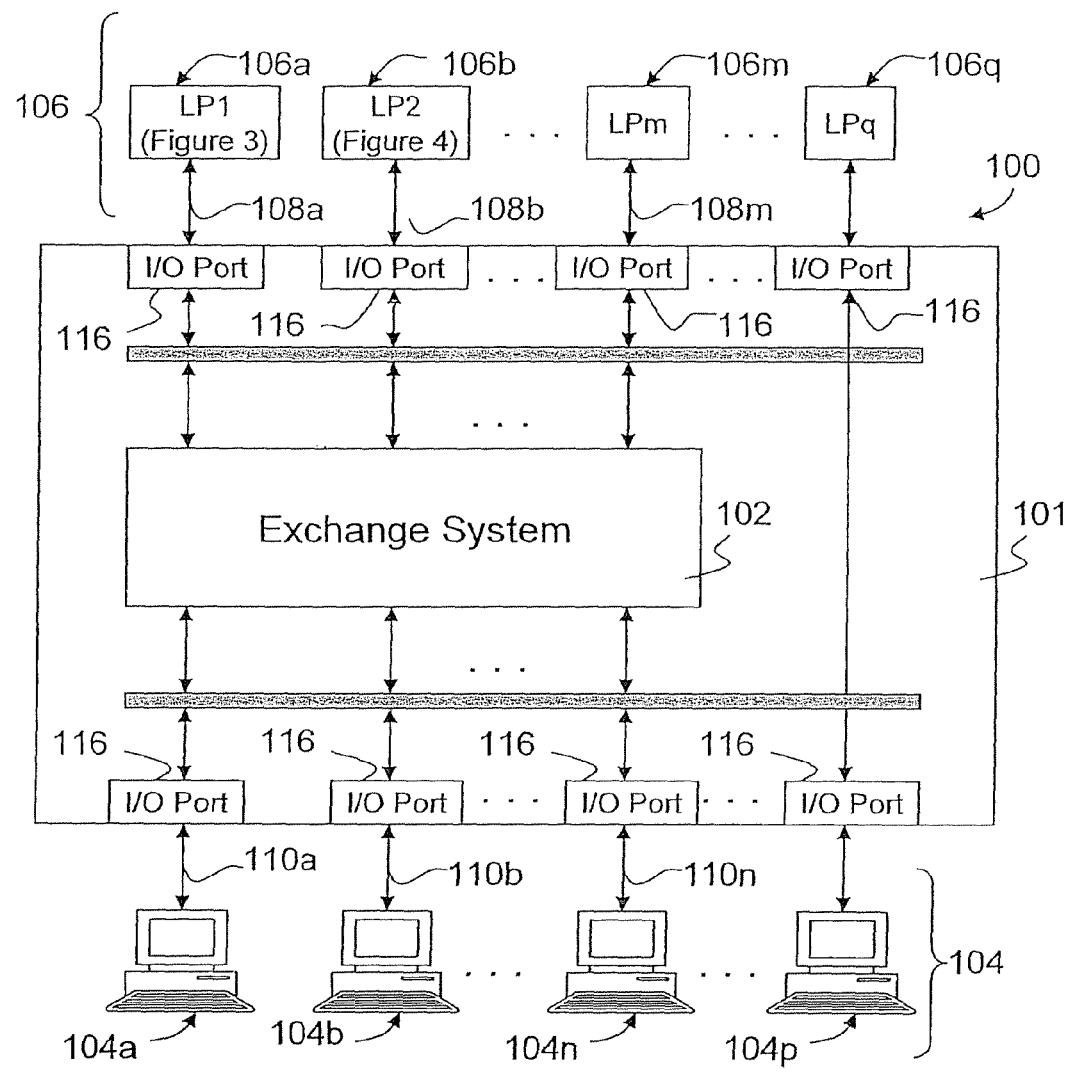
FIG. 1 schematically illustrates an embodiment of a system for managing transactions between users and loyalty programs.

Turning first to FIG. 1, there is shown an embodiment of a system 100 for managing transactions between data input terminals, referred to as users 104, each associated with a particular entity, and loyalty programs 106 with which the entities have registered and are therefore members. As will be explained more fully below, the loyalty programs 106 are constituted by databases that track transactions and rewards resulting from transactions of the different members. Similarly, it will be appreciated that the data input terminals or users 104 consist of general purpose computers or the like that are bound to a particular entity by way of a password or similar login procedure when performing a particular transaction. For the purpose of the present description, the activities undertaken by a member through the data input terminals will be referred to as the activities of the user 104.

The system includes a central processing hub 101 for managing transactions between users 104 and loyalty programs 106. Included within processing hub 101 is an exchange system 102 for facilitating the exchange of reward currency between multiple users 104. Users 104*a-n* interact with exchange system 102. The entity associated with each user 104*a-n* is a member of at least two of the participating loyalty programs 106. It will be appreciated that entities associated with other users 104 may be members of only one loyalty program and may conduct transactions using the data input terminals or users 104 directly with that loyalty program or through the hub 101 without interacting with exchange system 102. This is also shown in FIG. 1, in which user 104*p* interacts with loyalty program 106*q* without the involvement of exchange system 102.

As will be explained in detail below, exchange system 102 allows two users, say users 104*a* and 104*b*, to exchange X amount of reward currency of one loyalty program, say loyalty program 106*a*, for Y amount of reward currency of another loyalty program, say loyalty program 106*b*. The exchange rate between the reward currencies of loyalty programs 106*a* and 106*b* is established and agreed upon by users 104*a* and 104*b*. The exchange system 102 assesses users 104*a* and 104*b* a fee for effecting the exchange and subsequently pays loyalty programs 106*a* and 106*b* for allowing the transfer of reward currency between the accounts of users 104*a* and 104*b*.

For convenience, in the remainder of the description of the embodiments below, the reward currency will be assumed to be points. It will be appreciated, however, that different types of reward currency may be used depending on the type of reward currency offered by each loyalty program 106*a-m*. For example, a particular loyalty program may offer credits for upgrades, coupons, or other perks to its members rather than or in addition to points or miles. It is contemplated that reward currency of any type can be exchanged, and, moreover, that reward currencies of different types can be exchanged with each other.

Additionally, it will be appreciated that 'n' and 'm' designate arbitrary numbers, and that exchange system 102 may interact with any number of loyalty programs 106 and users 104. Typically, however, the number of users 104 will far exceed the number of loyalty programs 106.

Figure 2:
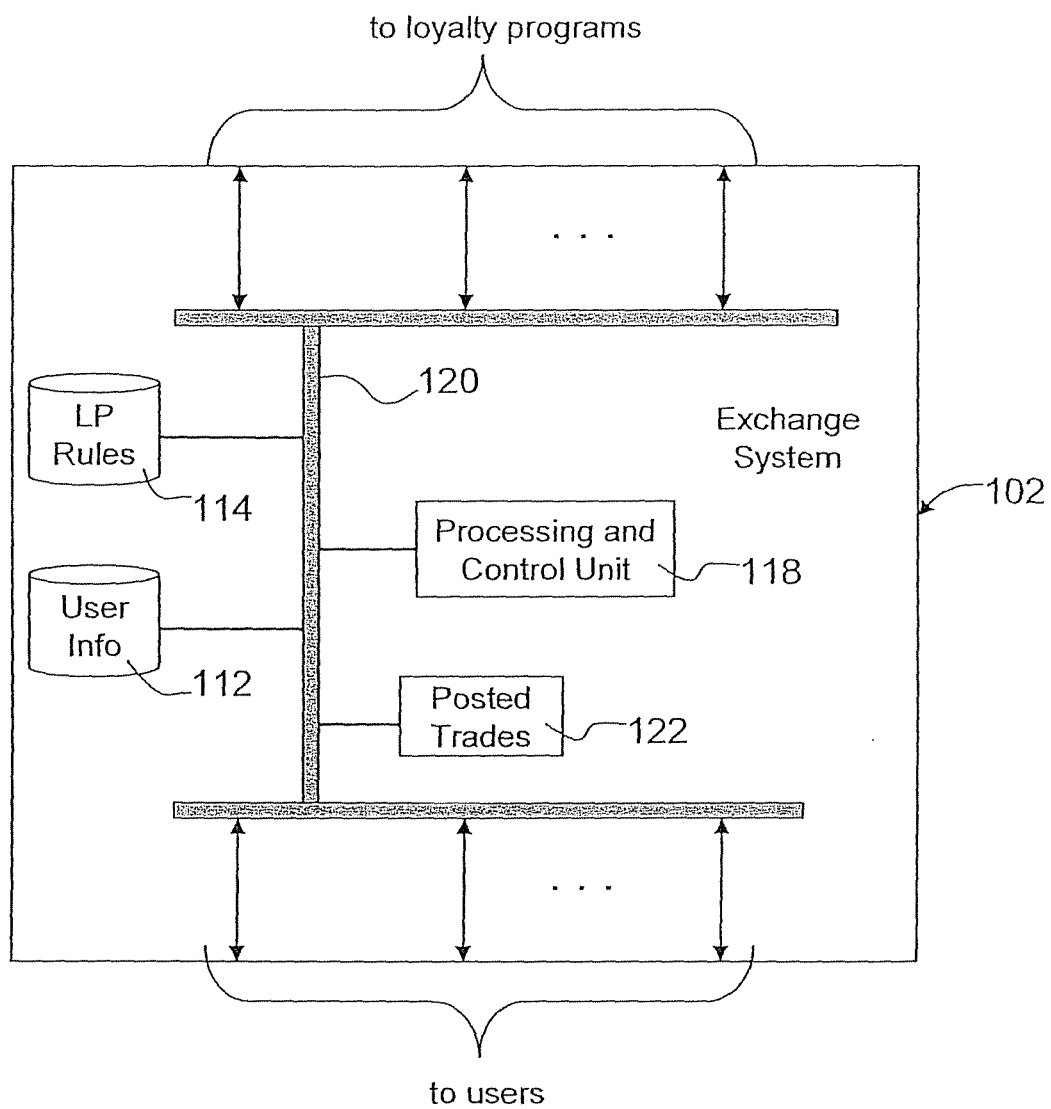
FIG. 2 schematically illustrates an embodiment of an exchange system.

As shown in FIG. 1, exchange system 102 is located within hub 101 and may share resources with the hub 101. Exchange system 102 utilizes input/output ports 116 for communicating with users 104 and loyalty programs 106. FIG. 2 shows a schematic of the internal structure of exchange system 102. Exchange system 102 further comprises: dedicated memory 112, 114, for storing information associated with the users 104 and the loyalty programs 106 respectively; internal buses 120 for transporting data and information throughout system 102; dedicated memory 122 for storing proposed trades posted by users; and a processing and control unit 118. The processing and control unit 118 may comprise hardware, computer readable software instructions, or a combination of both. It is configured to perform and coordinate operations relating to the exchange of loyalty points, such as those described in detail below.

Each of the users 104*a-n* communicates with exchange system 102 over communication links 110*a-n* respectively.

Typically, each communication link 110*a-n* represents an Internet communication link, and each user 104*a-n* interacts with exchange system 102 through a web-based portal.

Figure 3:
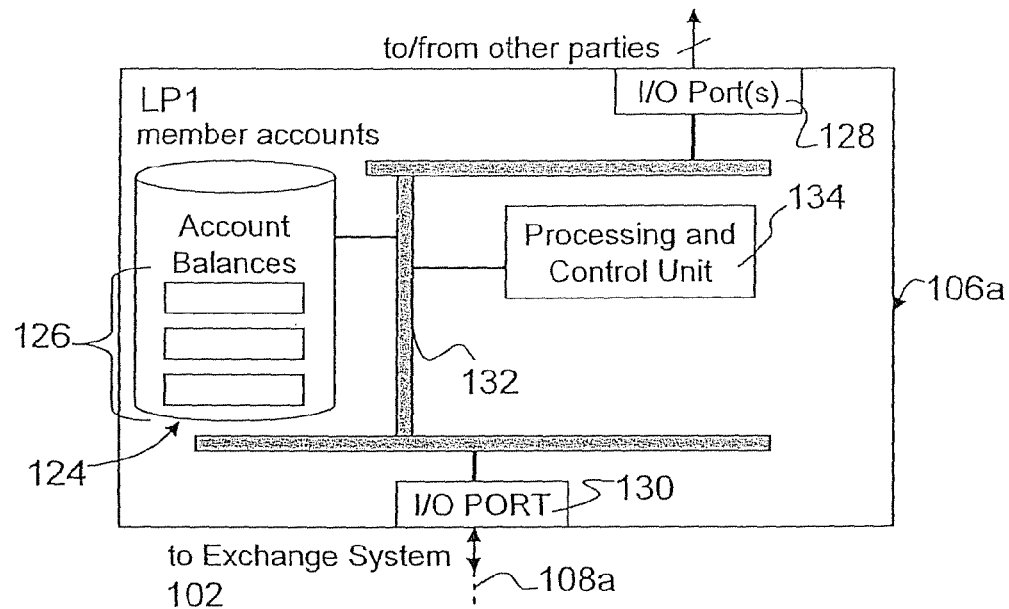
FIG. 3 schematically illustrates of an embodiment of a loyalty program.
Figure 4:
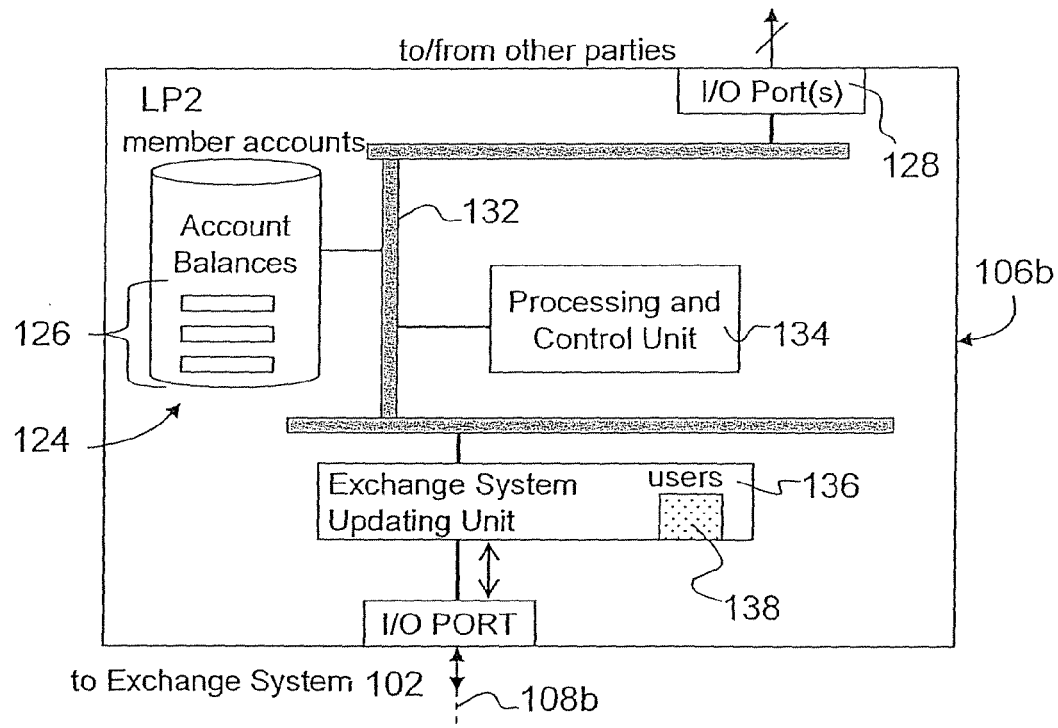
FIG. 4 schematically illustrates an alternative embodiment of a loyalty program.

Additionally, each of the loyalty programs 106*a-m* uses established communication links 108*a-m* for communication with exchange system 102. FIGS. 3 and 4 show schematics of the internal structure of two typical loyalty programs 106*a* and 106*b* respectively, which are configured for interacting with exchange system 102. Loyalty program 106*a* has a database 124 in which the account balances 126 of the members of loyalty program 106*a* are stored. These account balances are updated by merchants and other participating parties (not shown) who communicate with loyalty program 106*a* through one or more I/O ports 128. For example, if airline Y is a company participating in loyalty program 106*a*, then whenever a member completes a flight on airline Y, airline Y updates the member's account balance stored on database 124 by sending instructions to loyalty program 106*a* via I/O port 128. Additionally, an I/O port 130 receives communications from and sends communications to exchange system 102 over computer network link 108*a*. Internal buses 132 communicate information internally, and a processing and control unit 134 coordinates and performs processing and data transfer operations.

Loyalty program 106*a*, shown in FIG. 3, is configured to allow exchange system 102 to have direct read and write access to the account of each entity associated with each of users 104*a-n*. These accounts are stored on database 124. As will be explained in detail below, exchange system 102 can directly access and modify account balances of loyalty program 106*a* stored on database 124 through I/O port 130.

Alternatively, FIG. 4 shows the internal structure of loyalty program 106*b*, which has an alternative interfacing structure with exchange system 102. Loyalty program 106*b* generally includes the same hardware structures as loyalty program 106*a*, but additionally includes an exchange system updating unit 136 that acts as an intermediary between database 124 and exchange system 102. Loyalty program 106*b* does not allow exchange system 102 to have direct read and write access to account balances stored on database 124. Instead, unit 136 receives from exchange system 102 the account information for each of the entity associated with each user 104*a-n* having an account with loyalty program 106*b*. Unit 136 stores this information in dedicated memory 138. Then, periodically, updating unit 136 utilizes the account information stored in memory 138 to query the appropriate account balances of database 126 and obtain updated account balances. These updated account balances are then forwarded to exchange system 102 via communication link 108*b*. As will be explained in detail below, when the points of loyalty program 106*b* are involved in a trade, exchange system 102 sends a request to updater unit 136 to provide the current account balances for the users involved in the trade.

A particular loyalty program wishing to participate in the trading of its points agrees to allow exchange system 102 to access and modify the point account balances 126 of users 104 associated with the loyalty program. In the case of loyalty program 106*a*, exchange system 102 is granted direct read and write access to the account balances stored on database 124, which it accesses via link 108*a* and I/O port 130. In the case of loyalty program 106*b*, the updating unit 136 periodically sends updated account balances to exchange system 102, and exchange system 102 can make specific requests to updating unit 136 whenever the exchange system 102 wishes to modify or confirm a particular account balance for one of the entities associated with one of users 104*a-n* during a transaction.

Each loyalty program 106a-m provides exchange system 102 with limits or rules on the trading of points by each user 104a-n. For example, loyalty program 106a may specify that a member cannot trade more than 100,000 points in a given year, or that a member cannot trade more than 50,000 points during any given transaction. Loyalty program 106a is free to specify rules of this nature, or of any other nature, if it wishes. An example of such rules may include: limit of a maximum number of trades and/or transfer of points permitted within a given period of time; limit of a maximum number of points permitted to be received in a single transaction and/or within a given period of time; and/or limit of a maximum number of points permitted to give in a single transaction and/or within a given period of time. All rules specified by loyalty program 106a are sent to exchange system 102 via communication link 108a and are stored by exchange system 102 in memory 114, which is dedicated to storing information associated with loyalty programs 106. As will be explained in more detail below, exchange system 102 must ensure all exchanges of points between the users 104 comply with these rules stored in memory 114.

Exchange system 102 also establishes with each loyalty program 106a-m a fee to be charged for allowing the transfer of points from one account to another. The fee to be charged to users 104 is then stored in dedicated memory 114. This fee typically comprises a flat fee and/or a fee based on the number of points transferred. As will also be explained in more detail below, exchange system 102 tracks and collects these fees during exchanges and ultimately forwards payment to the appropriate loyalty programs.

A particular entity wishing to trade points, say the entity associated with user 104a, registers with exchange system 102 using a web based portal set up to allow user 104a to interact and interface with exchange system 102 over the Internet. Internet network link 110a facilitates the transfer of data between user 104a and exchange system 102. As shown in FIG. 5, access to the system 100 presents a webpage 500 that allows user 104a to register with exchange system 102. In fields 502 and 504, the entity associated with user 104a enters his name and email address. Fields 506 and 508 allow the entity associated with user 104a to establish a password for accessing the services of exchange system 102, and fields 510 and 512 are for providing to exchange system 102 information regarding the general location of user 104a. Such information is stored by exchange system 102 in designated memory 112.

Upon registering, user 104a also sends to exchange system 102 over link 110a the personal account information for each of the registered loyalty programs 106a-m the entity associated with user 104a is a member of and wants included in the exchange services offered by exchange system 102. This personal account information typically includes the username and/or account number and password assigned to the entity associated with user 104a by each of the loyalty programs. For example, if the entity associated with user 104a is a member of loyalty programs 106a and 106b, user 104a provides personal account information for these two loyalty programs. FIG. 6 shows an embodiment of a webpage 600 that allows the entity associated with user 104a to provide exchange system 102 with his personal account information for a particular loyalty program, say loyalty program 106a. In fields 602 and 604, the entity associated with user 104a inputs his or her name registered with the loyalty program 106a. In fields 606 and 608, the entity associated with user 104a then provides his or her account number and password for loyalty program 106a. This process would then be repeated for loyalty program 106b.

Figure 7:
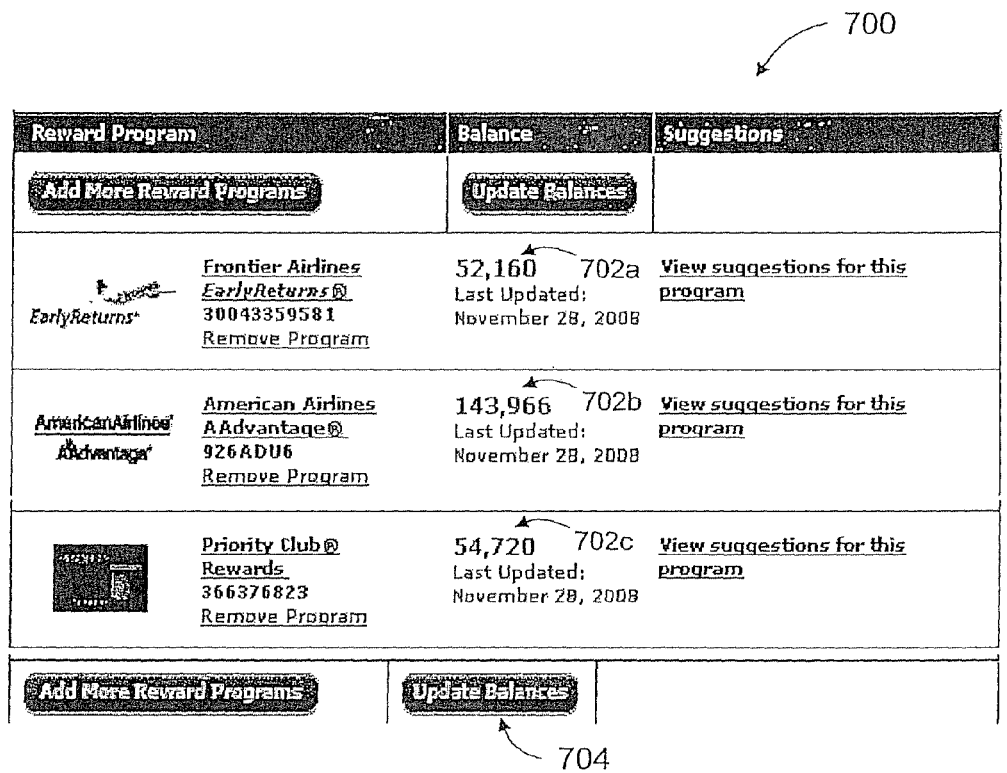
FIG. 7 shows an embodiment of a webpage accessed by a user wishing to view their account balances.

Such user information is stored by exchange system 102 in memory 112, which is dedicated to storing information relating to the users 104. Exchange system 102 subsequently uses the account information provided by user 104a to query loyalty programs 106a and 106b to confirm the entity associated with user 104a is indeed a member of these loyalty programs and to obtain the current points account balances for the entity associated with user 104a. In the case of loyalty program 106a, shown in FIG. 3, exchange system 102 does this by sending the personal account information of the entity associated with user 104a over communication link 108a, and uses this personal account information to directly access and read the account balance of the entity associated with user 104a on database 124. In the case of loyalty program 106b, shown in FIG. 4, exchange system 102 sends the personal account information from user 104a over communication link 108b to updating unit 136. Unit 136 stores this information in memory 138 and then uses it to access the account balance of the entity associated with user 104a stored on database 124 and forwards this account balance to exchange system 102. The received account balances from loyalty programs 106a and 106b are then stored locally by exchange system 102 in dedicated memory 112 and are made available to user 104a via network link 110a. Conveniently, exchange system 102 is therefore able to provide user 104a with a listing of all account balances for each loyalty program the entity associated with user 104a has registered with exchange system 102. As shown in FIG. 7, these account balances are preferably displayed on a single webpage 700, which is accessible by user 104a via network link 110a. Account balances 702a-c are shown in FIG. 7 corresponding to three different loyalty programs. Preferably, system 102 also allows user 104a to request an updated account balance for each or all of the loyalty programs 106 user 104a is a member of. This can be conveniently done using button 704 on webpage 700, which instructs exchange system 102 to display updated account balances. In the case of loyalty program 106a, exchange system 102 simply queries database 124 directly using the personal account information of the entity associated with user 104a to obtain the updated account balance. In the case of loyalty program 106b, exchange system 102 does not have direct access to database 124. Instead, unit 136 periodically sends to exchange system 102 updated account balances of those registered users 104 stored in its memory 138, which exchange system 102 uses for providing user 104a with the updated account balance of loyalty program 106b. Preferably such updates are provided to exchange system 102 by unit 136 relatively often (e.g. several times a day) to ensure the account balance of points being communicated to user 104a is accurate.

As will now be explained, exchange system 102 allows for two users to trade points between two different loyalty programs at an exchange rate established by and agreed upon by the users themselves. An embodiment of such a method is described with respect to FIGS. 8 and 9.

Figure 8:
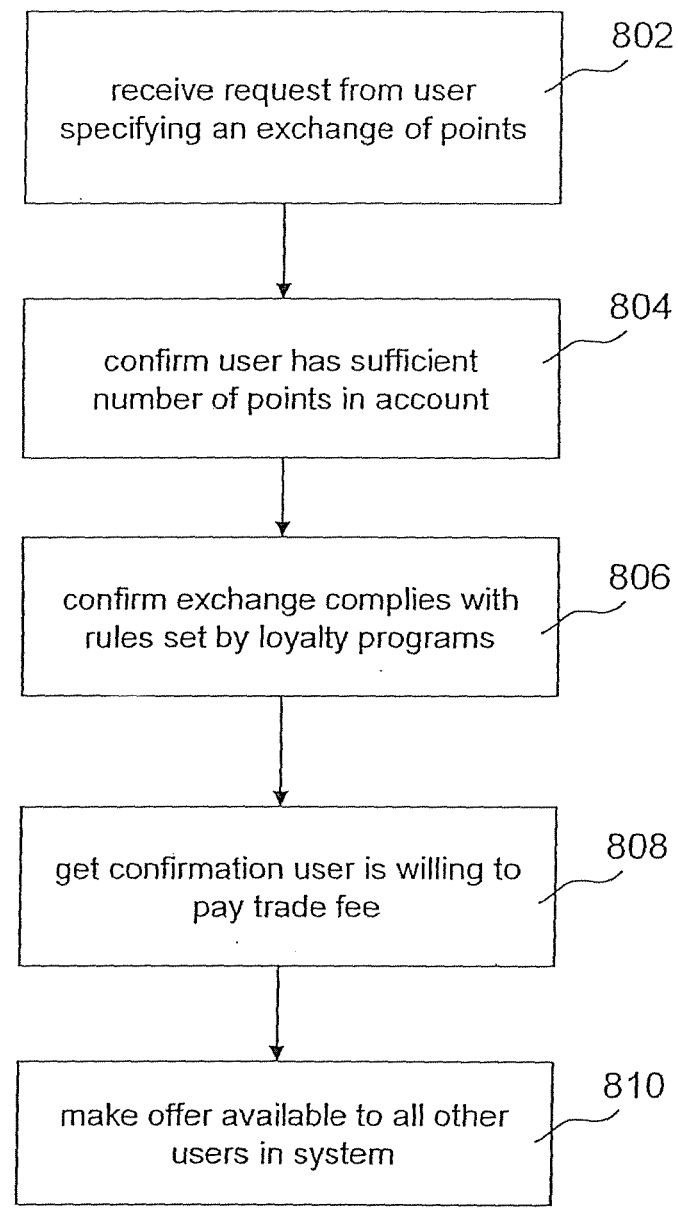
FIG. 8 shows a method of receiving an offer of trade from a particular user and making the offer available to all users.
Figure 10:
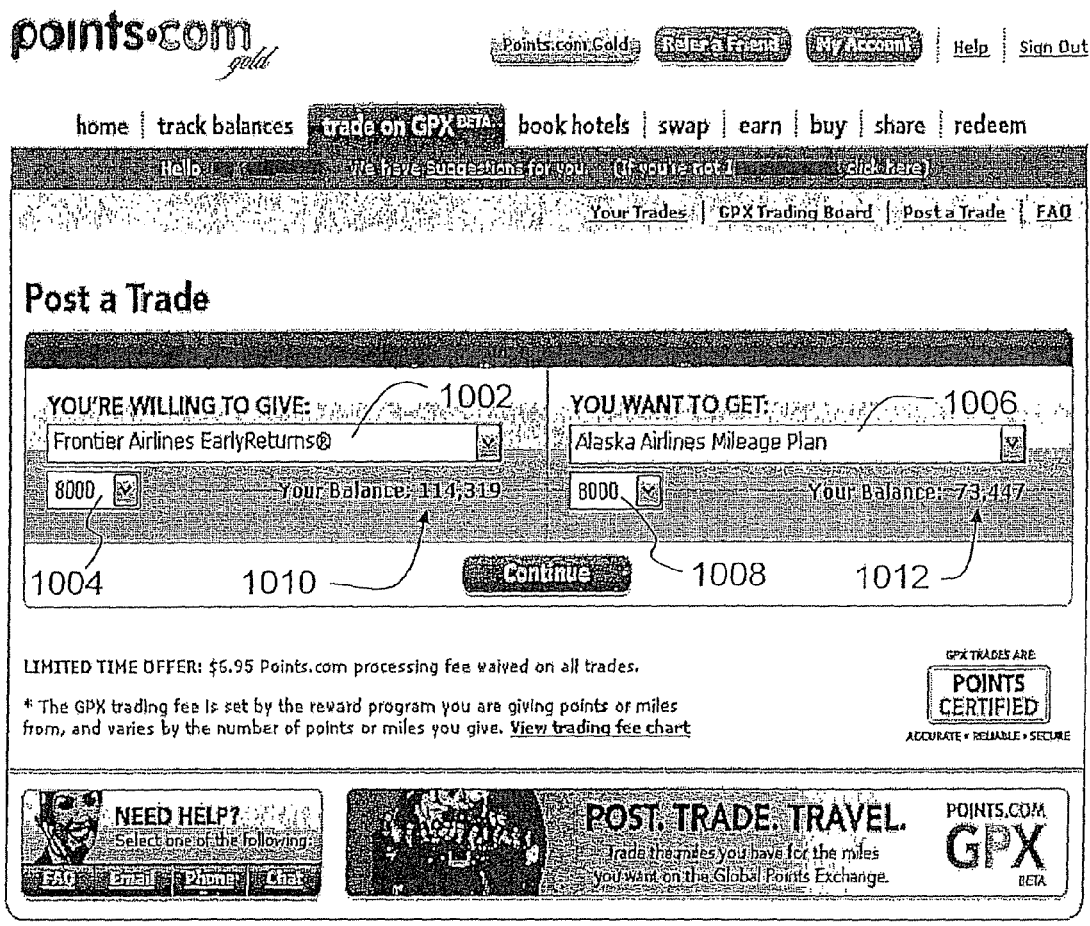
FIG. 10 shows an embodiment of a webpage accessed by a user wishing to send an offer to the exchange system.

Turning first to FIG. 8, in step 802, an entity interested in exchanging points, say the entity associated with user 104a, sends a request to exchange system 102 via link 110a specifying that it would be willing to give X points from its points account associated with a first loyalty program, say loyalty program 106a, in exchange for Y points for its points account associated with a second loyalty program, say loyalty program 106b. User 104a specifies this offer by entering the offer on a webpage hosted by exchange system 102. An embodiment of one such webpage is shown in FIG. 10. Using pull-down menus 1002 and 1004, the entity associated with user 104a can select a quantity of points it is willing to give from loyalty program 106a. Then, using pull-down menus 1006 and 1008, the entity associated with user 104a can select how many points it would like to get from loyalty program 106b. Conveniently, the account balances of the entity associated with user 104a for loyalty programs 106a and 106b are displayed at 1010 and 1012 respectively.

The values X and Y are freely specified by user 104a. In other words, the entity associated with user 104a effectively proposes and offers his own exchange rate between the points of loyalty program 106a and the points of loyalty program 106b based on the personal value he assigns to each one.

Upon receiving such a request, in step 804, system 102 confirms that the entity associated with user 104a has a sufficient number of points in his account associated with loyalty program 106a. Processing and control unit 118 therefore retrieves an updated account balance from loyalty program 106a, using the method described earlier, and checks that the entity associated with user 104a has the required number of points. Unit 118 also confirms that the entity associated with user 104a indeed has an account associated with loyalty program 106b to receive the Y points, for example, by querying updater unit 134 of loyalty program 106b. If any of these checks fail, the trade request is denied and user 104a is notified via communication link 110a. Preferably, if unit 118 determines that the entity associated with user 104a does not have an account associated with loyalty program 106b, exchange system 102 directs user 104a to a webpage similar to that shown in FIG. 6 and requests that user 104a registers their account associated with loyalty program 106b. Conveniently, once this is done, exchange system 102 returns to step 804.

Figure 12:
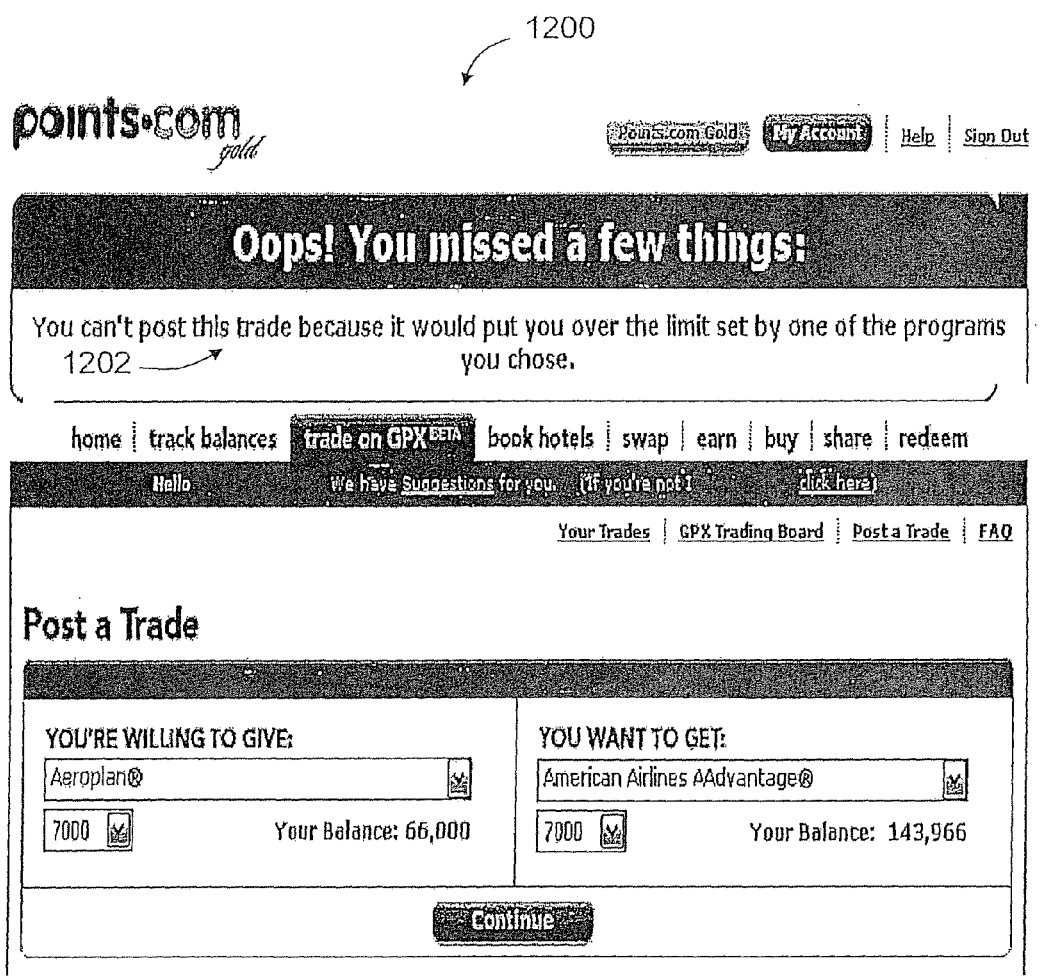
FIG. 12 shows an embodiment of a webpage displayed to a user after his offer request has been denied.

Similarly, in step 806, exchange system 102 also confirms that the trade proposed by user 104a complies with any and all rules set by loyalty programs 106a and 106b. As explained earlier, rules around trading and transferring points may be established by each loyalty program 106a-m. These limits and rules are stored in dedicated memory 114. Processing and control unit 118 reads these rules from memory 114 and confirms the trade request complies with any such rules. An example of such a process is shown in FIG. 11. In this example, user 104a has proposed an exchange of 10,000 of his points of loyalty program 106a in exchange for 20,000 points belonging to loyalty program 106b. Control unit 118 reads from memory 112 the transaction history of exchanges within the last 12 months by the entity associated with user 104a involving points of loyalty program 106a and points of loyalty program 106b. As shown in FIG. 11, the entity associated with user 104a has given 50,000 points of loyalty program 106a and received 0 points of loyalty program 106a within the last 12 months. The entity associated with user 104a has also given 0 points of loyalty program 106b and received 10,000 points of loyalty program 106b within the last 12 months. Control unit 118 then checks the proposed exchange against the rules 1102 loaded from memory 114. If any one of these rules is violated, the offer proposed by user 104a will be denied. In this case, Rule 1 established by loyalty program 106a: "Can only give max 55,000 points in 12 month period" would be violated since the entity associated with user 104a has already given 50,000 points of loyalty program 106a within the last 12 months and the offer is to give another 10,000 points of loyalty program 106a in exchange for 20,000 points belonging to loyalty program 106b. Therefore, the trade request of user 104a is denied. Exchange system 102 posts a statement on the website accessed by user 104a notifying user 104a that the request has been denied. This is shown in FIG. 12, in which statement 1202 on webpage 1200 informs user 104a that it is unable to post a trade.

It will be appreciated that in an alternative embodiment, exchange system 102 may not store the transaction histories in memory 112, but may instead query loyalty program 106a and/or loyalty program 106b to request the history of all point transfers for the entity associated with user 104a. This is particularly the case when a loyalty program has set a global point transfer limit that applies equally to point transfer applications outside of system 100. For example, another system with no association with system 100 may also transfer points into or out of the account of the entity associated with user 104a. In this case, exchange system 102 would have no way to track these transactions except by querying the loyalty program.

After confirming the proposed trade is permitted, in step 808, exchange system 102 then calculates the fee user 104a is required to pay to effect the trade. As explained earlier, fees are established that must be paid for points to be transferred from one account to another account. Processing and control unit 118 loads such fee information from memory 114 and calculates the fee user 104a must pay, if the trade were to be accepted. Exchange system 102 then confirms with user 104a that it is willing to pay this fee. As an example, the fee may be calculated based on a fee loyalty program 106a charges for transferring the X points out of the account of the entity associated with user 104a. User 104a confirms that it is willing to pay the fee by providing credit card information to system 102 via link 110a. Alternatively, user 104a could instead provide a retainer, collateral, or the like.

Upon the successful completion of the above steps, in step 810, exchange system 102 then stores the offer in memory 122 and "publishes" the offer of user 104a for all users 104 to access. This is done by exchange system 102 making available for all users 104a-n the offer of user 104a to exchange X points of loyalty program 106a for Y points of loyalty program 106b. In a preferred embodiment, exchange system 102 posts this offer on a website it hosts which all registered users 104a-n can access. FIG. 13 shows an embodiment of one such webpage available for all users 104a-n to access. A particular user, say user 104b, may access webpage 1300 and view trades 1302a-e posted by other users. Conveniently, exchange system 102 allows the entity associated with user 104b to view trading offers involving particular pairs of loyalty programs via pull-down boxes 1304 and 1306.

User 104b can access the offer made by user 104a and accept it if it is satisfied with the proposed exchange and wishes to make the trade. This process is described with reference to FIG. 9.

Figure 14:
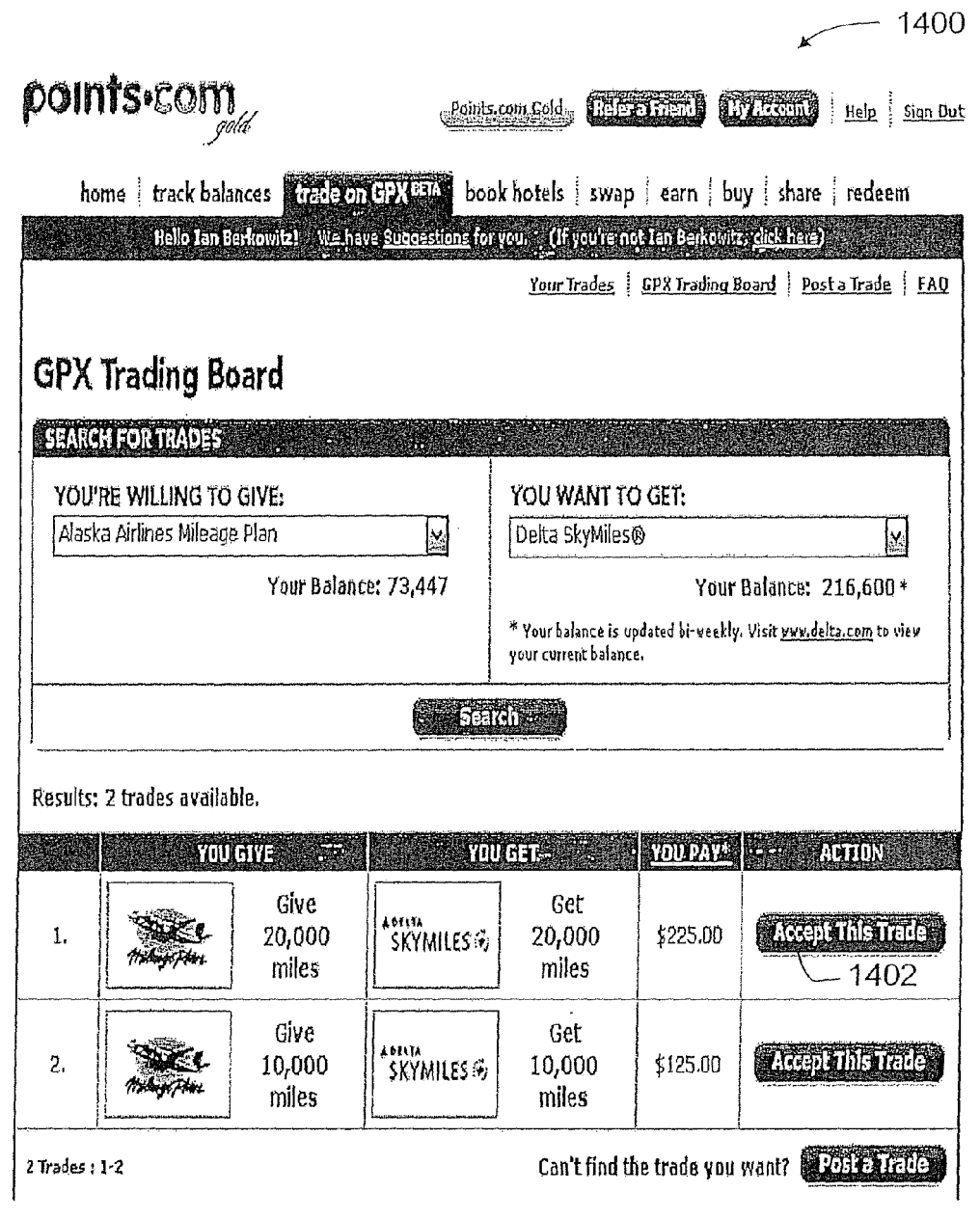

In step 902, user 104b first sends a request to exchange system 102 via network communication link 110b that it wishes to accept the offer of user 104a. FIG. 14 shows an embodiment of a webpage 1400 in which the entity associated with user 104b may click on button 1402 to send this request.

Upon receiving the request to accept the trade posted by user 104a, in step 904, system 102 confirms that the entity associated with user 104b has a sufficient number of points in his account associated with loyalty program 106b. Processing and control unit 118 therefore queries unit 136 of loyalty program 106b and requests an updated account balance for the entity associated with user 104b, and upon receiving the updated account balance confirms that the entity associated with user 104b has the required number of points. Unit 118 also confirms that the entity associated with user 104b indeed has an account associated with loyalty program 106a to receive the X points, which may be done by querying database 124 in loyalty program 106a. Preferably, if unit 118 determines that the entity associated with user 104b does not have an account associated with loyalty program 106a, exchange system 102 directs user 104b to a webpage similar to that shown in FIG. 6 and requests that user 104b registers their account associated with loyalty program 106a. Conveniently, once this is done, exchange system 102 returns to step 904.

Unit 118 also confirms that the entity associated with user 104a still has a sufficient number of points in his account associated with loyalty program 106a. This is done by accessing database 124 of loyalty program 106a to retrieve an updated account balance for the entity associated with user 104a. Such a check is important since the account balance of user 104a associated with loyalty program 106a may have changed since the offer of user 104a was posted. For example, the entity associated with user 104a may no longer have X points in his account associated with loyalty program 106a to exchange for Y points for his account associated with loyalty program 106b. If any of the above checks fail, the request of user 104b to accept the trade is denied.

Similarly, in step 906, exchange system 102 also confirms that the trade still complies with all rules set by loyalty programs 106a and 106b. Processing and control unit 118 loads these rules from memory 114, and, if necessary, also obtains the transaction histories of loyalty programs 106a and 106b. First, unit 118 determines whether user 104b is permitted to accept the trade using a process similar to that shown in FIG. 11. For example, if loyalty program 106b specifies that a given member cannot transfer more than 100,000 of his points in a 12 month period, and if the entity associated with user 104b has already exceeded this limit, then unit 118 will deny the request of user 104b to accept the trade. Unit 118 also determines whether user 104a is still permitted to make the trade. For example, user 104a could have engaged in other trades since its offer was posted and therefore no longer be permitted to make the exchange. If any of these checks fail, the request of user 104b to accept the trade is denied, and user 104b is notified by a posting on a webpage similar to that shown in FIG. 12.

After confirming the proposed exchange of points between user 104a and 104b is permitted, in step 908, processing and control unit 118 then calculates the fee user 104b is required to pay to effect the trade. For example, the fee may be calculated based on a fee loyalty program 106b charges for transferring the Y points out of the account of the entity associated with user 104b. User 104b submits payment of the fee, preferably by providing credit card information over network link 110b, which exchange system 102 processes. Exchange system 102 also collects the fee payment user 104a agreed to when making the offer in step 808 of FIG. 8. Exchange system 102 confirms payment has been successfully acquired. If an error in the payment collection process occurs, the trade is denied.

Figure 15:
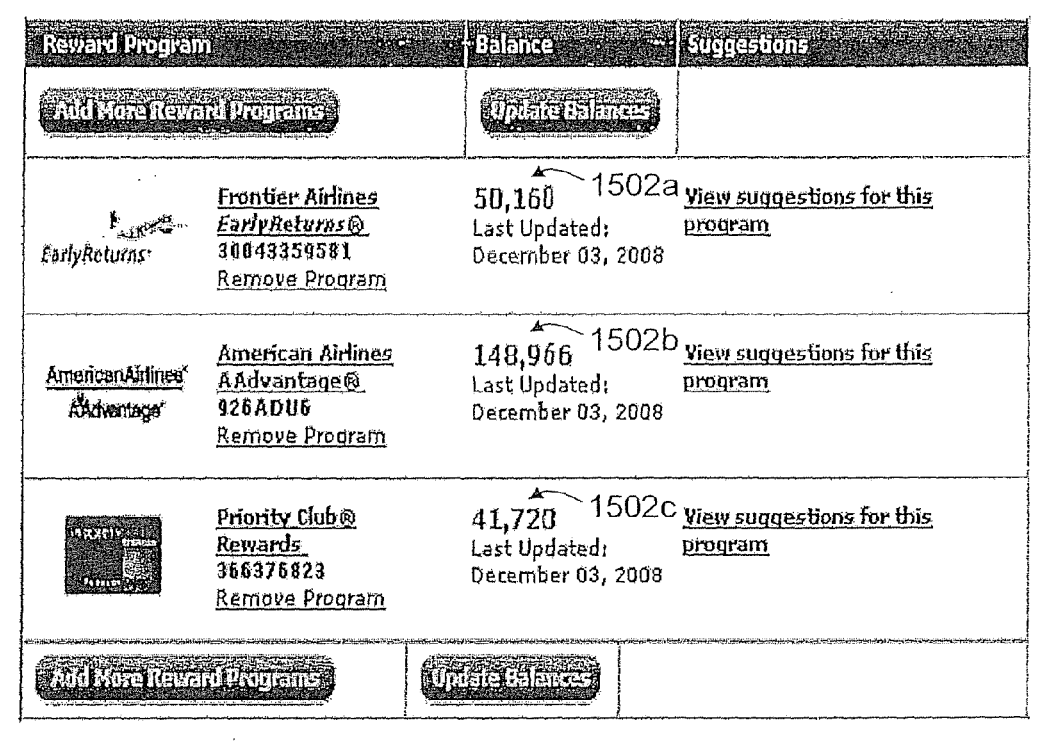

Finally, once the above steps are completed, processing and control unit 118 effects the exchange of points as follows. In step 910, unit 118 directly accesses database 124 of loyalty program 106a to debit X points from the account associated with user 104a and to credit X points to the account associated with user 104b. In step 912, unit 118 then queries unit 136 of loyalty program 106b and requests unit 136 to debit Y points from the account associated with user 104b and to credit Y points to the account associated with user 104a. Localized copies of the account balances associated with user 104a and 104b may also then be updated in memory 112. Both of the users 104a and 104b may then access the new account balances subsequent to the trade. FIG. 15 shows the account balances 1502a-c of the entity associated with user 104a, after a trade. Note that relative to FIG. 7 (before the trade) balance 1502b has increased by 5000 points and balance 1502c has decreased by 13,000 points.

After step 912 is completed, in step 914, exchange system 102 pays to loyalty programs 106a and 106b the portion of the fees it collected from users 104a and 104b that each loyalty program 106a and 106b is entitled to for allowing the trade. It will be appreciated that these fees need not necessarily be transferred to loyalty programs 106a and 106b immediately after the trade. For example, in general, exchange system 102 may periodically (e.g. on a weekly or monthly basis) pay to each of the loyalty programs 106a-m the total fee amount each loyalty program 106a-m is entitled to based on all the trades that occurred during the previous specified period of time.

In summary, exchange system 102 allows two users, who may be unknown to each other, to exchange points between two different loyalty programs at an exchange rate established and agreed upon by the users themselves. Therefore, if a particular member has points belonging to one particular loyalty program, which he cannot or does not wish to use, he may propose an exchange of some or all of these points for points from another loyalty program. If another user agrees with and accepts this offer of exchange, the trade will be effected by exchange system 102. Exchange system 102 collects a fee from the users, and then causes the appropriate points to be transferred in the users' accounts of each loyalty program. In this way, the members of the loyalty programs benefit since they can exchange points belonging to loyalty programs they do not or cannot use for points belonging to another loyalty program in which they wish to increase their holdings. The loyalty programs also benefit since exchange program 102 generates revenue for the loyalty programs by permitting the transfer of points. Notably, the value proposition to the members is attractive when compared to the other two options typically available in the market. The first such option is for the member to purchase the reward currency he or she wants to obtain without obtaining value for the reward currency he or she cannot or does not wish to use. However, it is well known that the cost to the member of purchasing reward currency in a program is much greater than the cost of transferring currency within a program because it requires the program to issue new reward currency. The other option is for the user to execute a swap or exchange transaction through a program such as that available at www.points.com where the member associated with the user may exchange the reward currency he or she does not want for the currency he or she desires. Such a transaction would typically result in a better value proposition than purchasing the desired reward currency since the member will obtain value for the redeemed reward currency. However, it is well known that the value provided for the redeemed reward currency is low since it requires the loyalty program to make a cash payment that is used to purchase reward currency in the other program. Moreover, as noted above, the cost of the purchased reward currency is high relative to the cost to transfer the reward currency within the loyalty program. In the present application, neither loyalty program involved in the trade issues any new points and no cash payments flow from the programs. Thus, the loyalty programs can offer pricing that compares with that charged for a transfer of points within a program.

Figure 16:
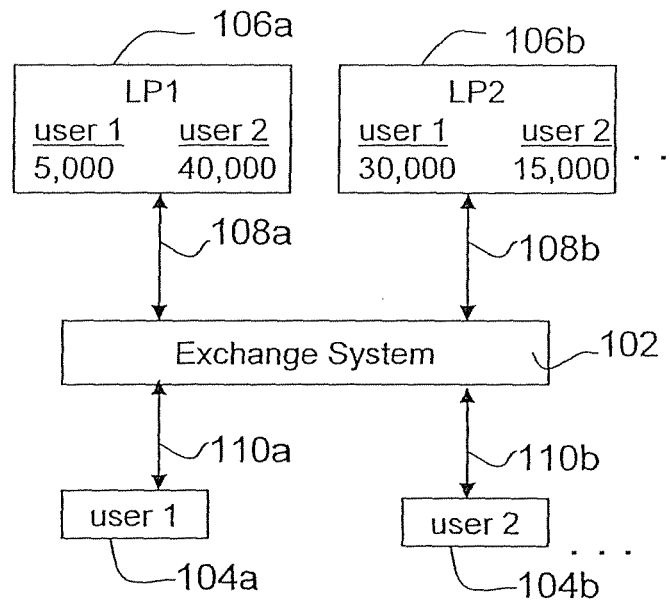
FIG. 16 schematically illustrates a particular example of exchanging points between two loyalty programs.
Figure 16:
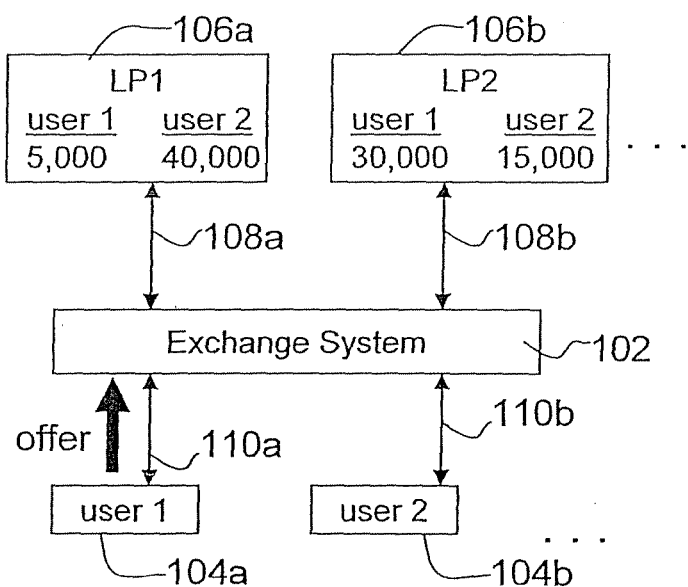
Figure 16:
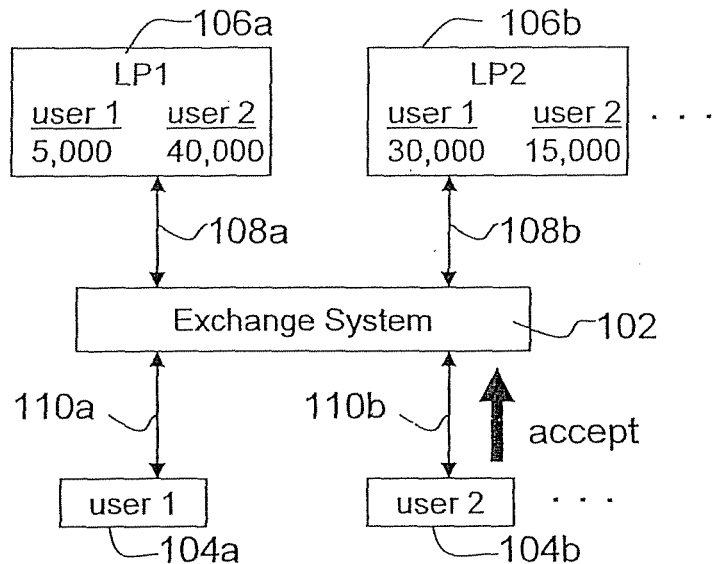
Figure 16:
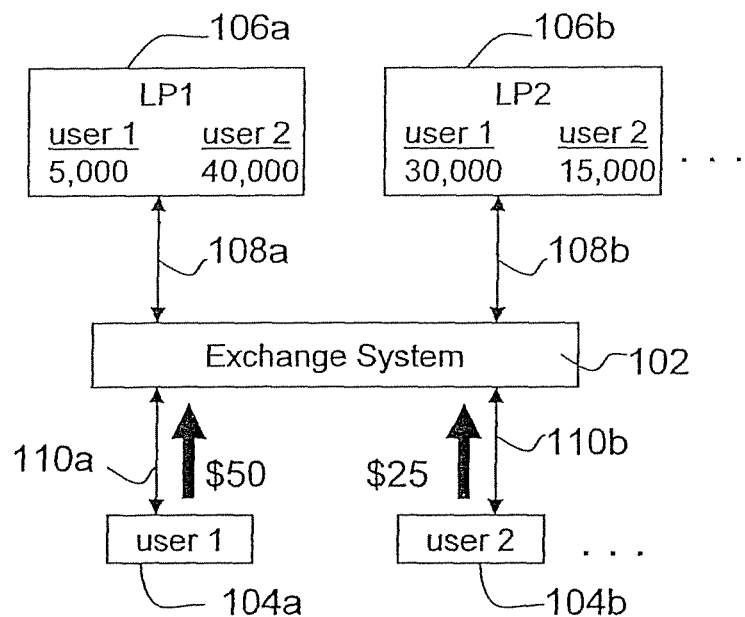
Figure 16:
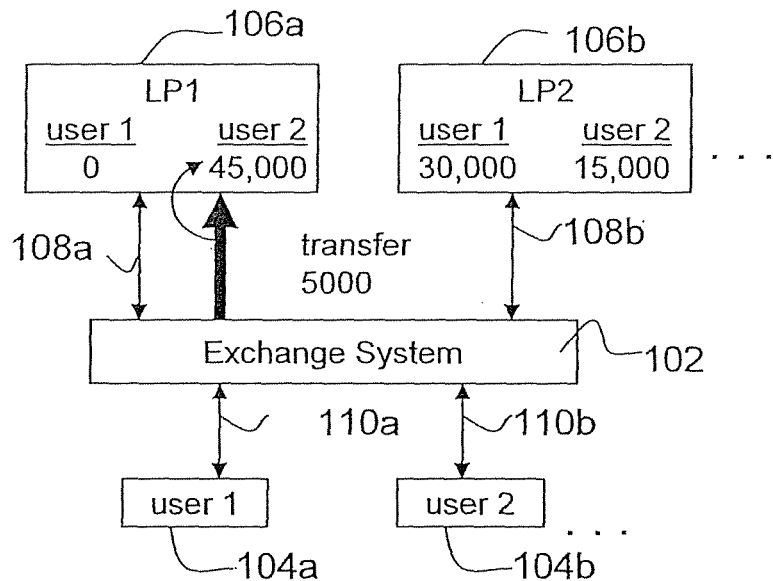
Figure 16:
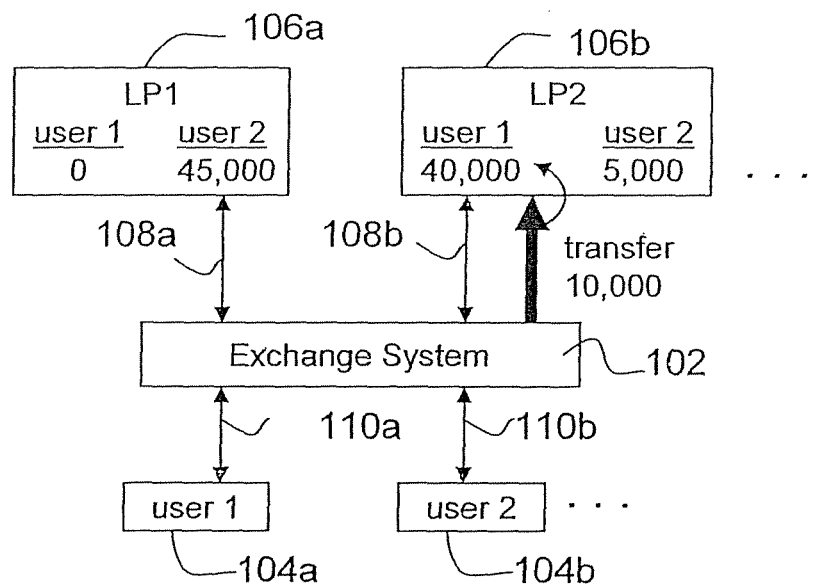
Figure 16:
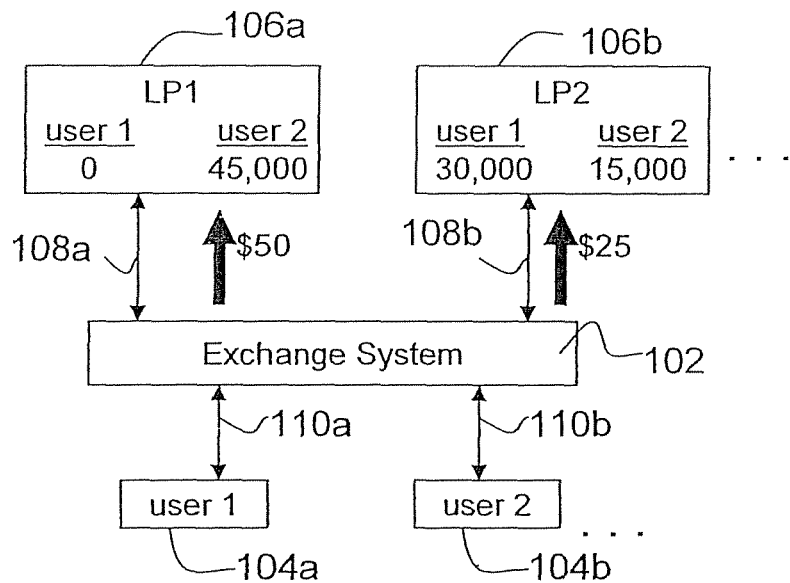
Figure 16:
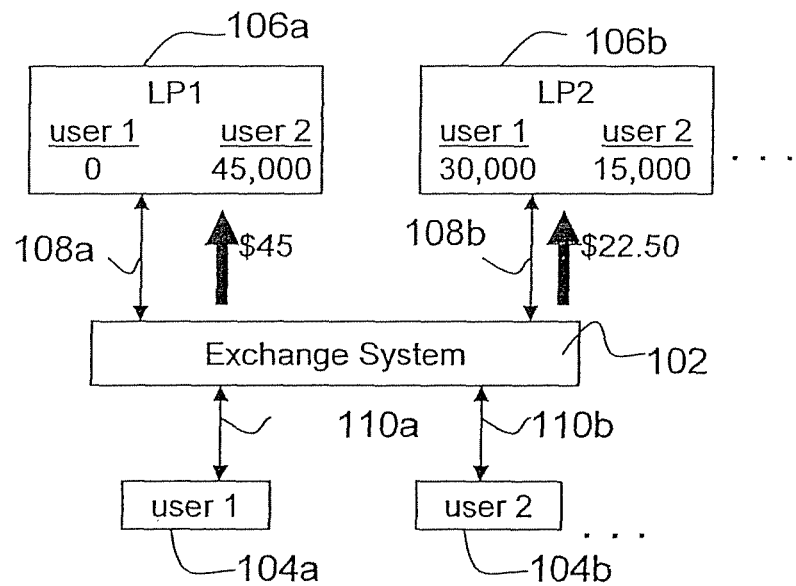

A specific example will now be described with reference to FIG. 16. The structural details shown in FIGS. 1 through 4 have been omitted for clarity.

As shown in FIG. 16(a), the entity associated with user 104a has accumulated 5,000 points from loyalty program 106a and 30,000 points from loyalty program 106b. The entity associated with user 104b has accumulated 40,000 points from loyalty program 106a and 15,000 points from loyalty program 106b.

The entity associated with user 104a cannot or does not want to use his 5,000 points from loyalty program 106a and therefore decides he would like to try and exchange these points for more points from loyalty program 106b. The entity associated with user 104a decides that points belonging to loyalty program 106b are not as valuable as points belonging to loyalty program 106a, and therefore decides to offer his 5,000 points of loyalty program 106a in exchange for 10,000 points belonging to loyalty program 106b. As shown in FIG. 16(*b*), user 104a therefore makes such a request in accordance with step 802 of FIG. 8. Exchange system 102 receives the request and confirms that the proposed exchange is permitted, as explained in steps 804 and 806 of FIG. 8. Exchange system 102 then calculates the fee user 104a would have to pay if such an exchange were to occur (step 808 of FIG. 8). For example, if loyalty program 106a has specified to exchange system 102 that a member must pay one cent per point transferred from its account, then exchange system 102 confirms with user 104a that it is willing to pay $50 (5,000 points×1 cent per point) to exchange system 102 to effect such an exchange. Exchange system 102 then makes the offer of user 104a available to all users 104a-n (step 810 of FIG. 8).

The entity associated with user 104b, who wishes to accumulate more points of loyalty program 106a, views this offer and decides that he is willing to accept the offer of exchange. As shown in FIG. 16(*c*), user 104b therefore sends a request to exchange system 102 indicating it would like to accept the offer. This corresponds to step 902 of FIG. 9. Exchange system 102 receives the request and confirms that the proposed exchange is permitted, as explained in steps 904 and 906 of FIG. 9. In accordance with step 908 of FIG. 9, exchange system 102 then calculates the fee user 104b is required to pay for the exchange to occur. For example, if loyalty program 106b has specified to exchange system 102 that a member must pay 0.25 cents per point transferred from its account, then exchange system 102 notifies user 104b that it must pay $25 (10,000 points×0.25 cents per point) to exchange system 102 to effect such an exchange. Exchange system 102 then collects the payment of $50 from user 104a and $25 from user 104b (FIG. 16(*d*)). In accordance with step 910 of FIG. 9, exchange system 102 then communicates with loyalty program 106a to debit 5,000 points from the account associated with user 104a and to credit 5,000 points to the account associated with user 104b. The result is shown in FIG. 16(*e*). Then, in accordance with step 912 of FIG. 9, exchange system 102 communicates with loyalty program 106b to debit 10,000 points from the account associated with user 104b and to credit 10,000 points to the account associated with user 104a. The result is shown in FIG. 16(*f*). Subsequently, in accordance with step 914 of FIG. 9, exchange system 102 forwards the payment of $50 it collected from user 104a to loyalty program 106a and the payment of $25 it collected from user 104b to loyalty program 106b, as shown in FIG. 16(*g*). Although not shown in this example or discussed in the embodiments above, optionally, exchange system 102 may deduct a commission from the $75 it collected before forwarding the money to loyalty programs 106a and 106b. For example, exchange system 102 may deduct 10% from the collected fee and therefore only forward $45 to loyalty program 106a and $22.50 to loyalty program 106b. This is shown in FIG. 16(*h*). Alternatively, exchange system 102 may negotiate with a particular loyalty program, say loyalty program 106a, a fee it will pay to loyalty program 106a per point it transfers from one member's account to another. Exchange system 102 may then charge the users a fee above that negotiated with loyalty program 106a and keep the difference. Also, optionally, exchange program 102 may charge an additional fixed transaction fee to each user 104a and 104b, which it keeps for effecting the trade.

Figure 9:
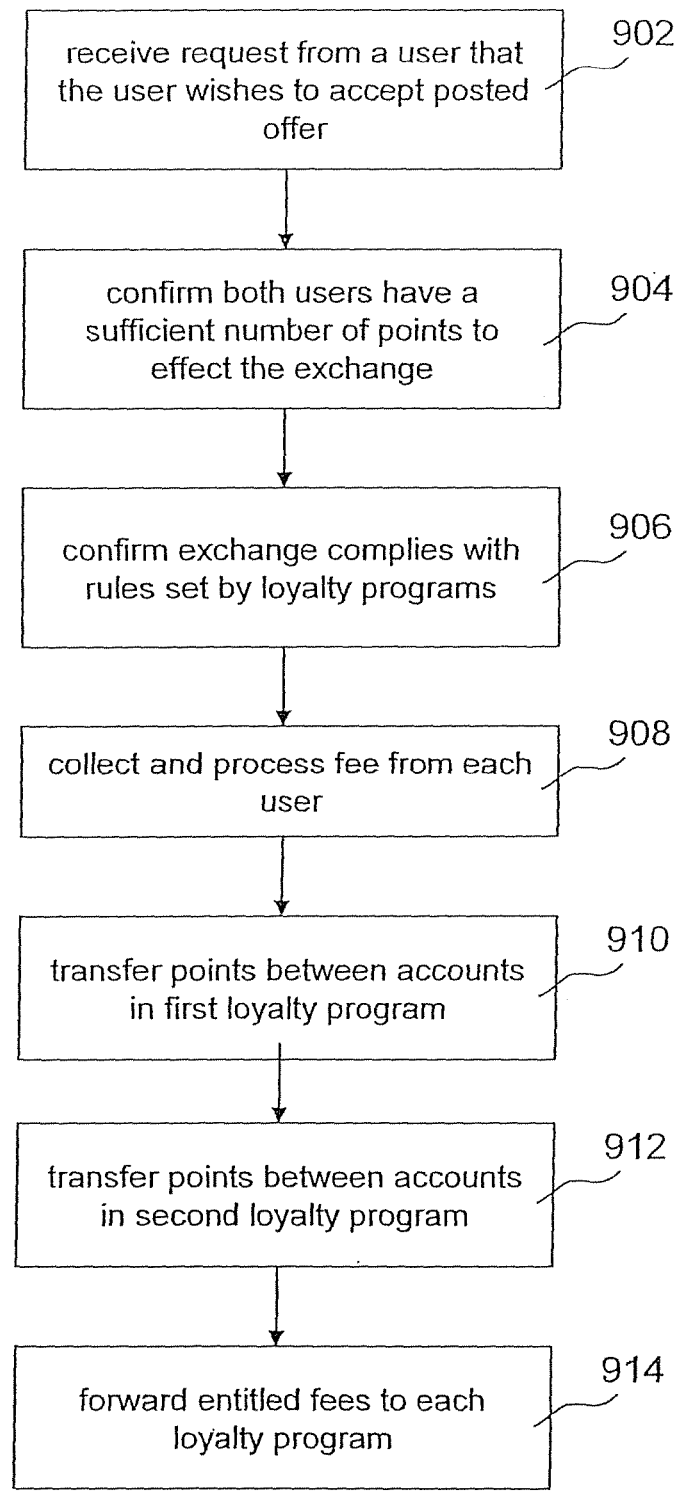
FIG. 9 shows a method of receiving a request from another user to accept the offer of trade and effecting the trade.
Figure 17:
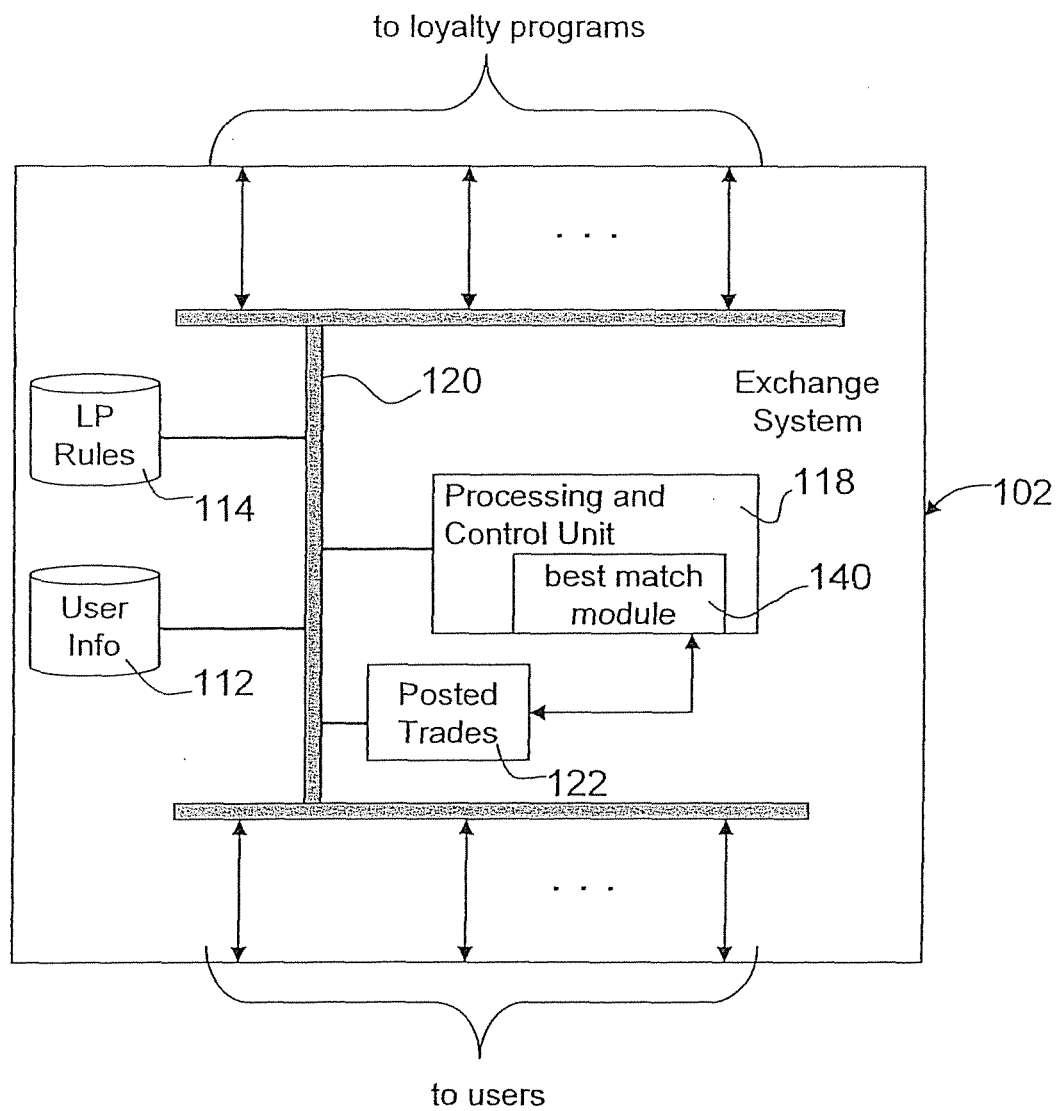
FIG. 17 schematically illustrates an embodiment of an exchange system having a module for searching for best matches.

It is contemplated that various other features and functions may be performed by exchange system 102 in relation to the exchange process described in FIGS. 8 and 9. For example, in step 802, when user 104a requests an exchange, exchange system 102 may first search for existing trades that have been posted by other users having similar terms or exchange rates. An embodiment of an exchange system 102 having such functionality is shown in FIG. 17. The internal structure is generally the same as that shown in FIG. 2; however, processing and control unit 118 further comprises a searching module 140 for searching existing trade offers stored in memory 122 and for identifying trades similar to that offered by other users. For example, if user 104a requests an exchange of 5,000 points of loyalty program 106a in exchange for 10,000 points belonging to loyalty program 106b, module 140 may first search existing trades in memory 122 and identify that there is a published offer from user 104c in which user 104c is offering to exchange 8,000 of points of loyalty program 106b for 4,000 points belonging to loyalty program 106a. User 104a may then be notified of the option of accepting this trade instead of posting its own. It is contemplated that a number of different algorithms may be employed by module 140 for searching for such similar trades. For example, one algorithm may look for trades having an equal exchange ratio/rate as that proposed by user 104a. Another algorithm may instead look for trades in which user 104a would receive the 10,000 points of loyalty program 106b he is looking to obtain. Alternatively, another algorithm may search for trades having a "close" ratio/rate as that proposed by user 104a, i.e. a ratio/rate within a specified margin of error. For example, if user 104a requests an exchange of 5,000 of points of loyalty program 106a in exchange for 10,000 points belonging to loyalty program 106b, module 140 may notify user 104a of a published offer from user 104c in which user 104c has offered to exchange 10,000 of points of loyalty program 106b for 6,000 points belonging to loyalty program 106a.

As mentioned earlier, the reward currency traded may be of different types. For example, the entity associated with user 104a may have a "free upgrade to $1^{st}$ class" credit earned through loyalty program 106a. The entity associated with user 104a may wish not to use this, but instead try and trade this upgrade for points belonging to loyalty program 106b. User 104a is free to offer any exchange amount between the upgrade and points belonging to loyalty program 106b. As long as another user is willing to agree to this exchange, and as long as all other conditions and rules described in FIGS. 8 and 9 are met, the exchange will occur.

Moreover, it is contemplated that system 100 and specifically exchange system 102 may operate more generally in environments in which merchants, currency issuers, or the like issue a product, service, or other tangible benefit as a currency to their members, which the members wish to exchange with each other. For example, a first merchant may issue concert tickets, gift cards, or some other currency to a first user who has registered and has an online account with the first merchant. In fact, this first user may have simply purchased the currency from the first merchant online. The first user may then wish to exchange this currency for another product or currency issued by a second merchant and possessed by a second user who has registered and has an online account with the second merchant. In this case, exchange system 102 could facilitate such a trade. The "loyalty programs" would be the merchants, currency issuers, or the like, and the "reward currency" would be the product or currency issued by the loyalty programs. In this example, the currency of the first loyalty program could be tickets for a particular event that the first user cannot use. He may then offer them to other users for points of a second loyalty program, or for tickets to a different event. The first user is free to stipulate the exchange rate and the exchange system 102 will conduct the exchange in an orderly manner. The first loyalty program will stipulate the terms and conditions under which the tickets may be exchanged, and will receive a benefit when such a trade is made.

Such a system may be adapted to groups of tickets, for example a season ticket owned by one entity to permit exchange of tickets with another entity who also owns a season ticket. If the first user wishes to have extra tickets for a particular game, he can offer other events in which he has less interest in exchange for the tickets he requires. Thus he may for example offer tickets to each of a particular team in return for a single game of his favorite team on a particular day. The system 102 will again permit the orderly transfer of the tickets in electronic form under the conditions permitted.

The system may also be of benefit for particular events such as an Olympic Games where packages of tickets are sold. The system 102 may be utilised to allow exchange of events within the package, thus enhancing the flexibility of the purchaser of the packages and offering the organiser the opportunity to realise further revenue from the exchange process.

It will be appreciated that in the above scenarios, the "tickets" are retained as data structures within the system that may be redeemed by the user prior to the event, such as by printing the ticket with suitable security features incorporated. Thus the exchange system 102 simply transfers the data structures between the users to effect the transfer.

Although the invention has been described with reference to certain specific embodiments, various modifications thereof will be apparent to those skilled in the art without departing from the spirit and scope of the invention as identified in the claims appended hereto.

What is claimed is:

1. A method of facilitating a trade of a first reward currency issued by a first loyalty program and held by a member represented by a first user for a second reward currency issued by a second loyalty program and held by a member represented by a second user comprising the steps of:
    (a) electronically receiving an offer from said first user representing a first member having an account associated with said first loyalty program and an account associated with said second loyalty program, said offer comprising data specifying one quantity of reward currency of said first loyalty program and specifying another quantity of reward currency of said second loyalty program for which said user is willing to trade said one quantity;
    (b) making said offer available to a group of users including said second user;
    (c) electronically receiving an acknowledgement from said second user representing a second member having an account associated with said first loyalty program and an account associated with said second loyalty program, said acknowledgement comprising data specifying that said second user wishes to accept said offer;
    (d) decrementing said one quantity of reward currency from said first member's account associated with said first loyalty program and incrementing said one quantity of reward currency in said second member's account associated with said first loyalty program to establish new account balances for said first member's account associated with said first loyalty program and said second member's account associated with said first loyalty program; and
    (e) decrementing said another quantity of reward currency from said second member's account associated with said second loyalty program and incrementing said another quantity of reward currency in said first member's account associated with said second loyalty program to establish new account balances for said second member's account associated with said second loyalty program and said first member's account associated with said second loyalty program.

2. The method of claim 1 further comprising the steps of:
    (a) notifying at least one of said first and second users of a fee to be paid for effecting said trade;
    (b) receiving payment of said fee from said at least one of said first and second users; and
    (c) subsequently forwarding a first portion of said payment to said first loyalty program and a second portion of said payment to said second loyalty program.

3. The method of claim 2 wherein said notifying at, least one of said first and second users of a fee to be paid for effecting said trade comprises the steps of:
    (a) notifying said first user of a first fee to be paid for effecting said trade; and
    (b) notifying said second user of a second fee to be paid for effecting said trade;
and wherein said receiving payment of said fee from said, at least one of said first and second users comprises the step of receiving payment of said first fee from said first user and said second fee from said second user.

4. The method of claim 3 wherein the step of receiving payment of said first fee from said first user and said, second fee from said second user occurs prior to steps (d) and (e) in claim 1.

5. The method of claim 4 wherein the step of notifying said first user of a first fee to be paid for effecting said trade occurs prior to step (b) of claim 1 and further comprises the step of receiving from said first user confirmation that said first user is willing to pay said first fee; and wherein the step of notifying said second user of a second fee to be paid for effecting said trade occurs prior to step (d) of claim 1 and further comprises the step of receiving from said second user confirmation that said second user is willing to pay said second fee.

6. The method of claim 1 further comprising the step of confirming said trade conforms to rules specified by said first loyalty program and said second loyalty program; wherein said step of confirming occurs prior to steps (d) and (e) of claim 1.

7. The method of claim 6 wherein said rules comprise at least one limit on said trade selected from the group consisting of: limit of a maximum number of trades permitted within a specified period of time; limit of a maximum amount of reward currency permitted to be traded during said trade; limit of a maximum amount of reward currency permitted to be received during a specified interval of time; and limit of a maximum amount of reward currency permitted to be given during a specified interval of time.

8. The method of claim 6 wherein the step of confirming said trade conforms to rules specified by said first loyalty program and said second loyalty program comprises the following steps:
    (a) prior to step (b) of claim 1, confirming said trade conforms to limitations imposed on said first member by said first loyalty program and said second loyalty program, and if said trade does not conform to said limitations imposed on said first member, then denying said offer from said first user; and (b) prior to step (d) of claim 1, confirming said trade conforms to limitations imposed on said second member by said first loyalty program and said second loyalty program, and if said trade does not conform to said limitations imposed on said second member, then denying said trade.

9. The method of claim 8 wherein step (b) of claim 8 further comprises the step of confirming said trade still conforms to limitations imposed on said first member by said first loyalty program and said second loyalty program, and if said trade does not still conform to said limitations imposed on said first member, then denying said trade.

10. The method of claim 1 wherein said reward currency of said first loyalty program comprises points, and wherein said reward currency of said second loyalty program comprises points.

11. The method of claim 1 further comprising the step of searching for trades offered by other users similar to said offer, and notifying said first user of said trades prior to step (b) of claim 1.

12. The method of claim 1 further comprising the steps of:
(a) prior to step (b) of claim 1, confirming said first user has registered said first member's account associated with said second loyalty program, and if not then requesting said first user register said first member's account associated with said second loyalty program; and
(b) prior to step (d) of claim 1, confirming said second user has registered said second member's account associated with said first loyalty program, and if not then requesting said second user register said second member's account associated with said first loyalty program.

13. A system for trading reward currency between a first loyalty program and a second loyalty program, said first loyalty program having a database having an account value stored thereon associated with a first member represented by a first user and an account value stored thereon associated with a second member represented by a second user, and said second loyalty program having a database having an account value stored thereon associated with said first member and an account value stored thereon associated with said second member, the system comprising:
(a) a plurality of communication links for communicating with a plurality of loyalty programs; said plurality of loyalty programs including said first loyalty program and said second loyalty program;
(b) a first communication link for electronically receiving an offer from said first user; said offer comprising data specifying one quantity of reward currency from said first member's account associated with said first loyalty program and specifying another quantity of reward currency for said first member's account associated with said second loyalty program for which said user is willing to trade said one quantity;
(c) a database accessible to a group of users for storing said offer thereon;
(d) a second communication link for electronically receiving an acknowledgement from said second user, said second user within said group, and said acknowledgement comprising data specifying that said second user wishes to accept said offer; and
(e) a processing unit configured for decrementing said one quantity of reward currency from said first member's account value associated with said first loyalty program and incrementing said one quantity of reward currency to said second member's account value associated with said first loyalty program, and configured for decrementing said another quantity of reward currency from said second member's account value associated with said second loyalty program and incrementing said another quantity of reward currency to said first member's account value associated with said second loyalty program.

14. The system of claim 13 wherein said processing unit is further configured for:
calculating a fee to be paid by at least one of said first and second users for effecting said trade and notifying said at least one of said first and second users over a communication link of said fee;
processing payment of said fee from said at least one of said first and second users received over said communication link;
calculating a first portion of said payment and a second portion of said payment; and
subsequently coordinating the transmission of said first portion to said first loyalty program and said second portion to said second loyalty program.

15. The system of claim 14 wherein calculating a fee to be paid by at least one of said first and second users for effecting said trade and notifying said at least one of said first and second users over a communication link of said fee comprises:
calculating a first fee to be paid by said first user for effecting said trade and notifying said first user over said first communication link, of said first fee; and
calculating a second fee to be paid by said second user for effecting said trade and notifying said second user over said second communication link of said second fee;
and wherein processing payment of said fee from said at least one of said first and second users received over said communication link comprises processing payment of said first fee from said first user received over said first communication link and said second fee from said second user received over said second communication link.

16. The system of claim 15 wherein said processing unit receives payment of said first, fee over said first communication link and said second fee over said second communication link prior to modifying account values.

17. The system of claim 16 wherein said calculating a first fee to be paid by said first user for effecting said trade and notifying said first user over said first communication link of said first fee occurs prior to storing said offer on said database; wherein said processing unit receives confirmation over said first communication link that said first user will pay said first fee; and wherein said processing unit receives confirmation over said second communication link that said second user will pay said second fee.

18. The system of claim 13 further comprising memory having stored thereon rules specified by said first loyalty program and rules specified by said second loyalty program, and wherein said processing unit is further configured for confirming said trade conforms to said rules.

19. The system of claim 18 wherein said rules comprise at least one limit on said trade selected from the group consisting of: limit of a maximum number of trades permitted within a specified period of time; limit of a maximum amount of reward currency permitted to be traded during said trade; limit of a maximum amount of reward currency permitted to be received during a specified interval of time; and limit of a maximum amount of reward currency permitted to be given during a specified interval of time.

20. The system of claim 18 wherein confirming said trade conforms to said rules comprises:
   prior to storing said offer on said database confirming said trade conforms to limitations imposed on said first member by said first loyalty program and said second loyalty program, and if said trade does not confirm to said limitations imposed on said first member, then denying said offer; and
   prior to modifying account values confirming said trade conforms to limitations imposed on said second member by said first loyalty program and said second loyalty program, and if said trade does not conform to said limitations imposed on said second member, then denying said trade.

21. The system of claim 20 wherein confirming said trade conforms to said rules further comprises:
   prior to modifying account values confirming said trade still conforms to limitations imposed on said first member by said first loyalty program and said second loyalty program, and if said trade does not still conform to said limitations imposed on said first member, then denying said trade.

22. The system of claim 13 wherein said reward currency of said first loyalty program comprises points, and wherein said reward currency of said second loyalty program comprises points.

23. The system of claim 13 wherein said processing unit further comprises a module for searching for trades offered by other users similar to said offer, and notifying said first user over said first communication link of said trades.

24. The system of claim 13 wherein said processing unit is further configured for:
   prior to storing said offer on said database, confirming said first user has registered said first member's account associated with said second loyalty program, and if not then requesting over said first communication link that said first user register said first member's account associated with said second loyalty program; and
   prior to modifying account values, confirming said second user has registered said second member's account associated with said first loyalty program, and if not then requesting over said second communication link that said second user register said second member's account associated with said first loyalty program.

25. In a system for managing transactions between users and loyalty programs wherein a first member represented by a first user has an account value representing reward currency stored on a database of a first loyalty program and an account value representing reward currency stored on a database of a second loyalty program and wherein a second member represented by a second user has an account value representing reward currency stored on said database of said first loyalty program and an account value representing reward currency stored on said database of said second loyalty program, a method of facilitating a trade of a first reward currency issued by said first loyalty program and held by said first, member for a second reward currency issued by said second loyalty program and held by said second member comprising the steps of:
   (a) electronically receiving an offer from said first user, said offer comprising data specifying one quantity of reward currency of said first loyalty program and specifying another quantity of reward currency of said second loyalty program for which said user is willing to trade said one quantity;
   (b) making said offer available to a group of users including said second user;
   (c) electronically receiving an acknowledgement from said second user, said acknowledgement comprising data specifying that said second user wishes to accept said offer;
   (d) decrementing said one quantity of reward currency from said first member's account value stored on said database of said first loyalty program and incrementing said second member's account value stored on said database of said first loyalty program by said one quantity of reward currency to establish new account values for said first member's account value stored on said database of said first loyalty program and said second member's account value stored on said database of said first loyalty program; and
   (e) decrementing said another quantity of reward currency from said second member's account value stored on said database associated with said second loyalty program and incrementing said first member's account value stored on said database associated with said second loyalty program by said another quantity of reward currency to establish new account balances for said second member's account value stored on said database associated with said second loyalty program and said first member's account value stored on said database associated with said second loyalty program.

26. The method of claim 25 further comprising the steps of:
   (a) notifying at least one of said first and second users of a fee to be paid for effecting said trade;
   (b) receiving payment of said fee from said at least one of said first and second users; and
   (c) subsequently forwarding a first portion of said payment to said first loyalty program and a second portion of said payment to said second loyalty program.

27. The method of claim 26 wherein said notifying at least one of said first and second users of a fee to be paid for effecting said trade comprises the steps of:
   (a) notifying said first user of a first fee to be paid for effecting said trade; and
   (b) notifying said second user of a second fee to be paid for effecting said trade;
   and wherein said receiving payment of said fee from said at least one of said first and second users comprises the step of receiving payment of said first fee from said first user and said second fee from said second user.

28. The method of claim 27 wherein the step of receiving payment of said first fee from said first user and said second fee from said second user occurs prior to steps (d) and (e) in claim 25.

29. The method of claim 28 wherein the step of notifying said first user of a first fee to be paid for effecting said trade occurs prior to step (b) of claim 25 and further comprises the step of receiving from said first user confirmation that said first user is willing to pay said first fee; and wherein the step of notifying said second user of a second fee to be paid for effecting said trade occurs prior to step (d) of claim 25 and further comprises the step of receiving from said second user confirmation that said second user is willing to pay said second fee.

30. The method of claim 25 further comprising the step of confirming said trade conforms to rules specified by said first loyalty program and said second loyalty program; wherein said step of confirming occurs prior to steps (d) and (e) of claim 25.

31. The method of claim 30 wherein said rules comprise at least one limit on said trade selected from the group consisting of: limit of a maximum number of trades permitted within a specified period of time; limit of a maximum amount of reward currency permitted to be traded during said trade; limit of a maximum amount of reward currency permitted to be received during a specified interval of time; and limit of a maximum amount of reward currency permitted to be given during a specified interval of time.

32. The method of claim 30 wherein the step of confirming said trade conforms to rules specified by said first loyalty program and said second loyalty program comprises the following steps:
   (a) prior to step (b) of claim 25, confirming said trade conforms to limitations imposed on said first member by said first loyalty program and said second loyalty program, and if said trade does not conform to said limitations imposed on said first member, then denying said offer from said first user; and
   (b) prior to step (d) of claim 25, confirming said trade conforms to limitations imposed on said second member by said first loyalty program and said second loyalty program, and if said trade does not conform to said limitations imposed on said second member, then denying said trade.

33. The method of claim 32 wherein step (b) of claim 32 further comprises the step of confirming said trade still conforms to limitations imposed on said first member by said first loyalty program and said second loyalty program, and if said trade does not still conform to said limitations imposed on said first member, then denying said trade.

34. The method of claim 25 wherein said reward currency of said first loyalty program comprises points, and wherein said reward currency of said second loyalty program comprises points.

35. The method of claim 25 further comprising the step of searching for trades offered by other users similar to said offer, and notifying said first user of said trades prior to step (b) of claim 25.

36. The method of claim 25 further comprising the steps of:
   (a) prior to step (b) of claim 25, confirming said first user has registered said first member's account associated with said second loyalty program, and if not then requesting said first user register said first member's account associated with said second loyalty program; and
   (b) prior to step (d) of claim 25, confirming said second user has registered said second member's account associated with said first loyalty program, and if not then requesting said second user register said second member's account associated with said first loyalty program.

* * * * *